(12) United States Patent
Yashima et al.

(10) Patent No.: US 10,809,208 B2
(45) Date of Patent: Oct. 20, 2020

(54) X-RAY INSPECTION DEVICE, X-RAY INSPECTION METHOD, AND METHOD OF MANUFACTURING STRUCTURE

(71) Applicant: NIKON CORPORATION, Tokyo (JP)

(72) Inventors: Hirotomo Yashima, Yokohama (JP);
Takahiro Michimoto, Yokohama (JP);
Naoshi Sakaguchi, Kawasaki (JP)

(73) Assignee: Nikon Corporation, Tokyo (JP)

( * ) Notice: Subject to any disclaimer, the term of this patent is extended or adjusted under 35 U.S.C. 154(b) by 313 days.

(21) Appl. No.: 15/792,061

(22) Filed: Oct. 24, 2017

(65) Prior Publication Data
US 2018/0045660 A1 Feb. 15, 2018

Related U.S. Application Data

(63) Continuation of application No. PCT/JP2015/062562, filed on Apr. 24, 2015.

(51) Int. Cl.
*G01N 23/04* (2018.01)
*G01N 23/046* (2018.01)
*G01B 15/04* (2006.01)
*G01N 23/083* (2018.01)
(Continued)

(52) U.S. Cl.
CPC ........... *G01N 23/046* (2013.01); *G01B 15/04* (2013.01); *G01N 23/04* (2013.01); *G01N 23/083* (2013.01); *G01N 23/18* (2013.01); *G01B 15/00* (2013.01); *G01N 2223/3306* (2013.01); *G01N 2223/3307* (2013.01); *G01N 2223/3308* (2013.01); *G01N 2223/419* (2013.01)

(58) Field of Classification Search
None
See application file for complete search history.

(56) References Cited

U.S. PATENT DOCUMENTS

| | | | |
|---|---|---|---|
| 5,119,408 A * | 6/1992 | Little | G01N 23/046 378/10 |
| 5,319,693 A * | 6/1994 | Eberhard | A61B 6/032 378/19 |
| 7,233,644 B1 | 6/2007 | Bendahan et al. | |

(Continued)

FOREIGN PATENT DOCUMENTS

| | | |
|---|---|---|
| CN | 101057135 A | 10/2007 |
| CN | 101960296 A | 1/2011 |

(Continued)

OTHER PUBLICATIONS

Notification of the First Office Action dated Aug. 1, 2019 from the Chinese National Intellectual Property Administration, PRC in counterpart Chinese Patent Application No. 201580079138.8.

(Continued)

*Primary Examiner* — Thomas R Artman
(74) *Attorney, Agent, or Firm* — Finnegan, Henderson, Farabow, Garrett & Dunner, L.L.P.

(57) ABSTRACT

The X-ray inspection device includes a radiation source that irradiates X-rays toward a specimen that is rotated; a detector that detects transmitted X-rays irradiated by the radiation source, and passed through the specimen, and output a plurality of detection data for each angle of rotation; and a region extracting unit that extracts a region where the specimen is projected onto the detector, using the plurality of detection data.

22 Claims, 12 Drawing Sheets

(51) Int. Cl.
*G01N 23/18* (2018.01)
*G01B 15/00* (2006.01)

(56) References Cited

U.S. PATENT DOCUMENTS

| | | | |
|---|---|---|---|
| 7,775,715 B2* | 8/2010 | Warner | G01N 23/046 378/20 |
| 8,777,485 B2* | 7/2014 | Holt | A61B 6/03 250/252.1 |
| 2005/0254621 A1 | 11/2005 | Kalender et al. | |
| 2006/0262893 A1 | 11/2006 | Tang et al. | |
| 2008/0212734 A1* | 9/2008 | Kasperl | G01T 1/2985 378/4 |
| 2009/0268869 A1 | 10/2009 | Hadland | |
| 2010/0118027 A1 | 5/2010 | Weiss | |
| 2010/0220834 A1 | 9/2010 | Heismann et al. | |
| 2012/0303333 A1 | 11/2012 | Stuke et al. | |
| 2018/0045660 A1* | 2/2018 | Yashima | G01N 23/046 |

FOREIGN PATENT DOCUMENTS

| | | |
|---|---|---|
| CN | 102413770 A | 4/2012 |
| CN | 102590235 A | 7/2012 |
| CN | 104138267 A | 11/2014 |
| DE | 10 2007 016 370 A1 | 10/2008 |
| JP | 2002-310943 | 10/2002 |
| JP | 2003-156454 | 5/2003 |
| JP | 2013-217797 | 10/2013 |
| WO | WO 2014/165455 | 10/2014 |

OTHER PUBLICATIONS

International Search Report dated Jul. 21, 2015 in International Application No. PCT/JP2015/062562.
Extended European Search Report dated Mar. 27, 2019 issued in European Application No. 15889924.5.
Brunke, Oliver, "Fully-Automated 3D Metrology and Defect Analysis with High-Resolution 300 kV Microfocus Computed Tomography", 18$^{th}$ World Conference on Nondestructive Testing, Apr. 16-20, 2012, Durban, South Africa.
Notification of Reason(s) for Refusal Office Action dated Feb. 5, 2019 issued by the Japan Patent Office in Japanese Patent Application No. 2017-513937.
Supplementary Partial European Search Report dated Dec. 11, 2018 by the European Patent Office in corresponding European Patent Application No. 15889924.5.
Reisinger, S., et al., "Simulation-Based Planning of Optimal Conditions for Industrial Computed Tomography", International Symposium on Digital Industrial Radiology and Computed Tomography, Jan. 1, 2011 (pp. 1-8).
The second Office Action dated May 12, 2020 from The State Intellectual Property Office of People's Republic of China in counterpart Chinese Patent Application No. 201580079138.8.

* cited by examiner

X-RAY INSPECTION DEVICE, X-RAY INSPECTION METHOD, AND METHOD OF MANUFACTURING STRUCTURE

INCORPORATION BY REFERENCE

This application is a continuation of international application No. PCT/JP2015/062562 filed Apr. 24, 2015.

The disclosures of the following priority applications are herein incorporated by reference: International application No. PCT/JP2015/062562 filed Apr. 24, 2015.

BACKGROUND OF THE INVENTION

1. Field of the Invention

The present invention relates to an X-ray inspection device, X-ray inspection method, and a method of manufacturing a structure.

2. Description of Related Art

An X-ray apparatus such as that disclosed in the Patent Literature US 2009/0,268,869, which irradiates a specimen with X-rays and detects transmitted X-rays that have been transmitted through the specimen, is known as a device that obtains information of the interior of the specimen in a non-destructive manner.

SUMMARY OF THE INVENTION

When a specimen is inspected using X-rays, there is a possibility that inspection failure will occur due to collision between the X-ray source and the specimen, for example, depending on the distance between the X-ray source and the specimen. Furthermore, there is a possibility that inspection defects will occur due to collision between the specimen and the detector, for example, depending on the distance between the specimen and the detector. Furthermore, there is a possibility that inspection defects will occur due to collision between the specimen, the X-ray source, and the detector, for example, depending on the distance between the X-ray source, the specimen, and the detector. Furthermore, when projecting a projection image of the specimen on the detector, detection of the projected image across a broad range on the detector is preferable.

According to the first aspect of the present invention, the X-ray inspection device includes a radiation source that irradiates X-rays toward a specimen that is rotated, a detector that detects transmitted X-rays irradiated by the radiation source and passed through the specimen, and output a plurality of detection data for each angle of rotation, and a region extracting unit that extracts a region where the specimen is projected onto the detector, using the plurality of detection data.

According to the second aspect of the present invention, the X-ray inspection device according to the first aspect preferably may include a change unit that changes a relative distance between the specimen and the radiation source, based on the region extracted by the region extracting unit.

According to a third aspect of the present invention, the X-ray inspection device of the second aspect preferably includes a calculating unit that calculates a change amount in the relative distance between the specimen and the radiation source, based on the region extracted by the region extracting unit, and the changing unit preferably changes the relative distance based on the change amount that was calculated by the calculating unit.

According to the fourth aspect of the present invention, the X-ray inspection device according to the first aspect is preferably configured such that the region extracting unit generates synthesized data by synthesizing a plurality of detection data, and extracts an outer edge unit of the specimen in the synthesized data as the region.

According to the fifth aspect of the present invention, the X-ray inspection device according to the fourth aspect is preferably configured such that the region extracting unit generates the synthesized data, and extracts the region by binarizing the synthesized data.

According to the sixth aspect of the present invention, the X-ray inspection device according to the fifth aspect is preferably configured such that the region extracting unit extracts an outermost edge part in a first direction where a distance to the detection range of the detector is shortest in the first direction that is orthogonal to an axis of rotation, and an outermost edge part in a second direction where the distance to the detection range of the detector is shortest in the second direction along the axis of rotation, among the outer edge parts of the extracted region; and the calculating unit calculates the change amount in the relative distance based on an outermost edge part where the distance to the detection range of the detector is shortest among the outermost edge part in the first direction and the outermost edge part in the second direction.

According to the seventh aspect of the present invention, the X-ray inspection device according to the sixth aspect is preferably configured such that the calculating unit calculates the change amount in the relative distance based on one of a first ratio between a first segment and the length in the first direction of the detection region of the detector, and a second ratio between a second segment and the length in the second direction of the detection range of the detector, in a rectangular region surrounded by the first segment in the first direction that contacts the outer edge part of the extracted region in synthesized data and the second segment in the second direction that intersects with the first direction and contacts the outer edge part of the extracted region.

According to the eighth aspect of the present invention, the X-ray inspection device of the seventh aspect preferably has a configuration where the calculating unit compares a first change amount of the relative distance based on the first ratio with a second change amount of the relative distance based on the second ratio, and calculates a smaller value of the first and second change amounts as the change amount of the relative distance.

According to the ninth aspect of the present invention, the X-ray inspection device of the seventh aspect preferably has a configuration where the change unit changes the relative distance by moving the specimen or the radiation source along a direction of an optical axis of the radiation source, based on the change amount in the relative distance calculated by the calculating unit.

According to the tenth aspect of the present invention, the X-ray inspection device of the ninth aspect preferably includes a rotating placement unit that places and rotates the specimen, wherein the change unit changes the relative distance between the specimen and the radiation source by moving the rotating placement unit along the direction of the optical axis of the radiation source.

According to the eleventh aspect of the present invention, the X-ray inspection device according to the tenth aspect preferably has a configuration where the change unit changes the relative positional relationship between the specimen and the radiation source by moving the rotating placement unit along a direction of a rotational axis such that a center in the second direction of the region in the synthesized data aligns with a center point of the detection range of the detector in the second direction.

With the twelfth aspect of the present invention, the X-ray inspection device according to the second aspect preferably further includes an image generating unit that generates a back projection image of the specimen based on the plurality of detection data detected and output by the detector based on an irradiation of the X-rays from the radiation source, after the relative distance between the radiation source and the specimen has been changed by the change unit.

With the thirteenth aspect of the present invention, the X-ray inspection device includes a radiation source that irradiates X-rays onto the specimen, a detector that detects transmitted X-rays irradiated from the radiation source and passed through the specimen, and outputs detection data, a preliminary inspection unit that calculates a change amount in a relative distance between the specimen and the radiation source, using the detection data, and changes the relative distance between the specimen and the radiation source based on the change amount of the relative distance that was calculated, and an image generating unit that generates a back projection image of the specimen using the detection data output from the detector that detects the transmitted X-rays from the radiation source after the relative distance was changed by the preliminary inspection unit.

With the fourteenth aspect of the present invention, the X-ray inspection device of the thirteenth aspect preferably has a configuration where the radiation source irradiates X-rays onto a specimen that is rotated, the detector outputs a plurality of detection data for each rotated angle, and the preliminary inspection unit extracts a region where the specimen is projected on the detector from the plurality of detection data, calculates the change amount in the relative distance based on the region where the specimen is projected, and changes the relative distance based on the change amount that was calculated.

According to the fifteenth aspect of the present invention, the X-ray inspection method includes irradiating X-rays from the radiation source onto a specimen that is rotated, detecting transmitted X-rays irradiated, and passed through the specimen, outputting a plurality of detection data for each angle of rotation, and extracting a region where the specimen is projected, using the plurality of detection data.

According to the sixteenth aspect of the present invention, in the X-ray inspection method according to the fifteenth aspect a relative distance between the specimen and the radiation source is preferably changed, based on the extracted region.

According to the seventeenth aspect of the present invention, the X-ray inspection method of the sixteenth aspect preferably further includes calculating a change amount in the relative distance between the specimen and the radiation source, based on the extracted region, and changes the relative distance in accordance with the change amount that was calculated.

With the eighteenth aspect of the present invention, the X-ray inspection method according to the seventeenth aspect preferably includes generating a back projection image of the specimen based on the plurality of detection data detected and output based on an irradiation of the X-rays, after the relative distance between the radiation source and the specimen has been changed.

According to the nineteenth aspect of the present invention, a method for manufacturing structures includes creating design information regarding a shape of a structure; creating the structure based on the design information; acquiring shape information by measuring the shape of the created structure by using the X-ray inspection device according to the first aspect; and comparing the acquired shape information with the design information.

With the twentieth aspect of the present invention, the method for manufacturing structures according to the nineteenth aspect preferably performs refabrication of the structure by implementation based on the comparison results between the shape information and the design information.

With the twenty-first aspect of the present invention, in the method for manufacturing structures according to the twentieth aspect, the refabrication of the structure preferably includes performing creation of the structure again based on the design information.

DESCRIPTION OF EMBODIMENTS

Embodiment 1

Figure 1:
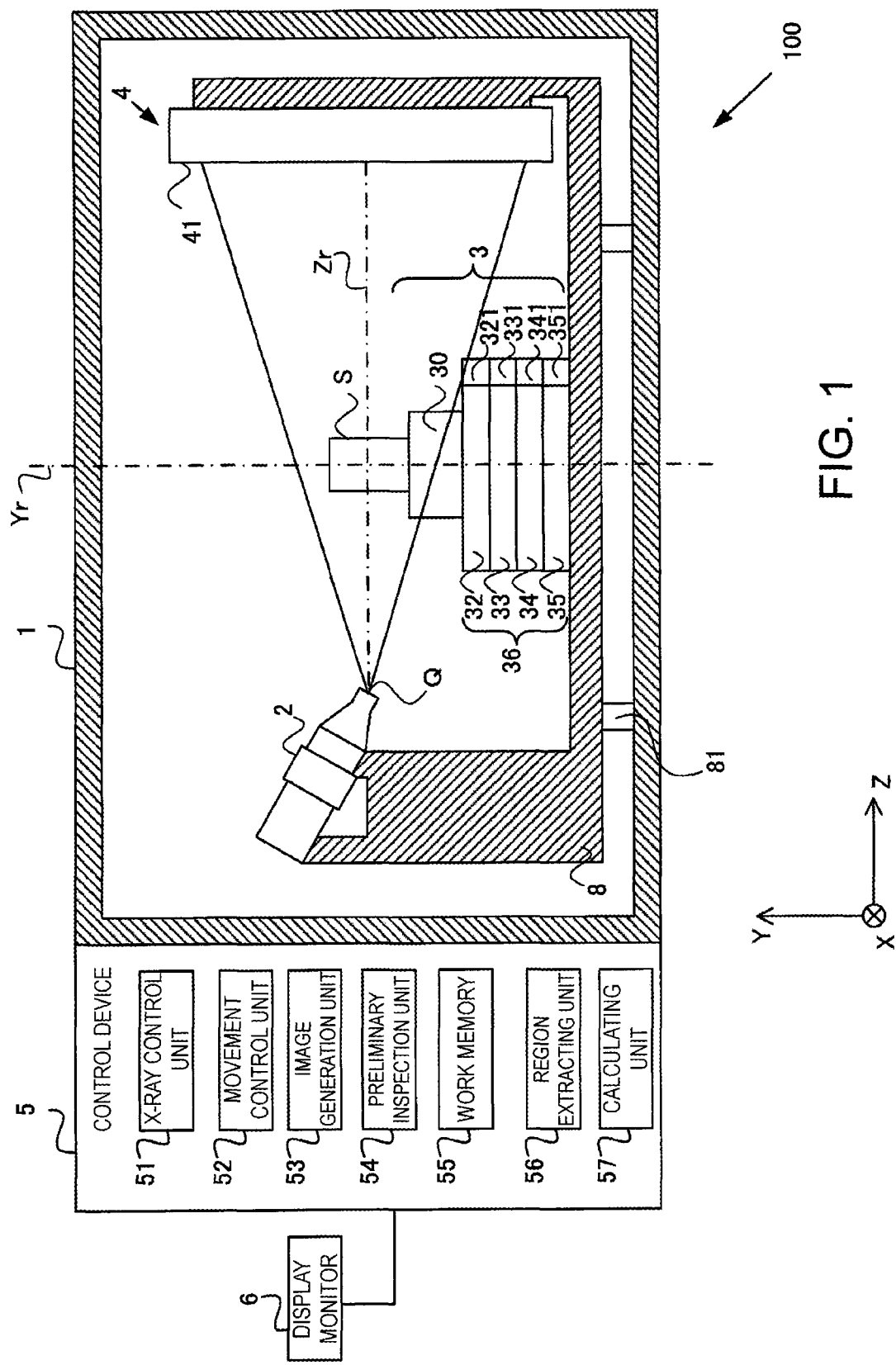
FIG. 1 is a block diagram illustrating one example of a configuration of an X-ray apparatus according to a first embodiment.

An X-ray apparatus according to a first embodiment is described while referring to the drawings. The X-ray apparatus non-destructively acquires the internal information, for example, of the internal configuration or the like of a specimen by irradiating X-rays at the specimen and detecting the transmitted X-ray passing through the specimen. If the specimen is an industrial component such as a mechanical component or an electronic component or the like, the X-ray apparatus is referred to as an industrial X-ray CT (Computed Tomography) inspection device that inspects an industrial product.

The present embodiment is for describing the gist of the invention in detail for understanding, and does not limit the present invention unless explicitly stated.

FIG. 1 is a drawing schematically illustrating an example of a configuration of X-ray device 100 according to the present embodiment. Note that for convenience of description, a coordinate system composed of an X-axis, Y-axis, and a Z-axis is set as is illustrated in the drawing.

The X-ray device 100 is provided with a housing 1, an X-ray source 2, a placement unit 3, a detector 4, a control device 5, a display monitor 6, and a frame 8. The housing 1 is disposed such that a bottom surface is substantially parallel to, or in other words horizontally, the XZ plane on the floor surface of a factory or the like and internally houses an X-ray source 2, placement unit 3, detector 4, and frame 8. The housing 1 includes lead as a material so that X-rays do not leak to the outside.

The X-ray source 2 emits X-rays in a cone shape (a so-called "cone beam") in the Z-axis+direction along an optical axis Zr parallel to the Z-axis with the emission point Q illustrated in FIG. 1 as the vertex, based on control by a control device 5. The emission point Q corresponds to the focal point of the X-ray source 2. The optical axis Zr connects the emission point Q, which is the focal point of the X-ray source 2, with the center of the imaging region of the detector 4 described hereinafter. Note that for the X-ray source 2, instead of emitting X-rays in a cone shape, an X-ray source that emits X-rays in a fan shape (a so-called "fan beam") is also included in one aspect of the present invention. The X-ray source 2 can emit, for example, at least one of: an approximately 50 eV ultrasoft X-ray, an approximately 0.1 to 2 keV soft X-ray, an approximately 2 to 20 keV X-ray, and a hard X-ray with at least approximately 20 to 100 keV. Furthermore, the X-ray source 2 may emit X-rays of 1 to 10 Mev, for example.

The placement unit 3 has a placement stage 30 on which the specimen S is placed, and a manipulator 36 made from a rotation drive unit 32, a Y-axis movement unit 33, an X-axis movement unit 34, and a Z-axis movement unit 35, provided further to the Z-axis+side than the X-ray source 2. The placement stage 30 is provided so as to be rotatable by the rotation drive unit 32, and when the manipulator 36 moves in the X-axis, Y-axis, or Z-axis directions due to the rotation drive unit 32, the placement stage 30 also moves in conjunction. Furthermore, the surface of the placement stage 30 has an index or the like that is used for positioning when a specimen S is placed on the center of rotation or the like when rotationally driven by the rotation drive unit 32.

The rotation drive unit 32 is, for example, configured to include an electric motor or the like, and is parallel to the Y-axis and rotates the placement stage 30 with an axis passing through the center of the placement unit 30 as a rotational axis Yr via the rotational force generated by an electric motor controlled and driven by a control device 5, described hereinafter. In other words, the rotation drive unit 32 changes the relative direction of the placement stage 30 and the specimen S on the placement stage 30 with regard to the X-rays emitted from the X-ray source 2 by rotating the placement stage 30. The Y-axis movement unit 33, the X-axis movement unit 34, and the Z-axis movement unit 35 are controlled by the control device 5, and each move the placement stage 30 in the X-axis direction, the Y-axis direction, and the Z-axis direction respectively so that the specimen S is positioned in the emission range of the X-rays emitted by the X-ray source 2. The Z-axis movement unit 35 is controlled by the control unit 5, and moves the placement stage 30 in the Z-axis direction so that the distance from the X-ray source 2 to the specimen S is a distance where the projection image of the specimen S is at the desired magnification ratio.

A Y position detector 331, X position detector 341, and Z position detector 351 are encoders that detect the corresponding position of the placement stage 30 that has moved in the X-axis direction, Y-axis direction, and Z-axis direction by the Y-axis movement unit 33, X-axis movement unit 34, and Z-axis movement unit 35, and that output a signal indicating the detected position to a control device 5. Incidentally, in the following description, the position of the placement stage 30 detected by the Y position detector 331, X position detector 341, and the Z position detector 351 is referred to as the detected movement position.

The rotation position detector 321 detects the rotation position of the placement stage 30 that rotates around the rotational axis Yr by the rotation drive unit 32. Incidentally, in the following description, the rotation position of the placement stage 30 detected by the rotation position detector 321 is referred to as the detected rotation position. The detected rotation position expresses the relative direction of the specimen S on the placement stage 30 with regard to the X-rays emitted from the X-ray source 2.

The detector 4 is provided further to the Z-axis+side than the X-ray source 2 and the placement stage 30. In other words, the placement stage 30 is provided between the X-ray source 2 and the detector 4 in the Z-axis direction. The detector 4 has an incident surface 41 parallel to the XY plane, and X-rays including the transmitted X-rays emitted from the X-ray source 2 and have passed through the specimen S placed on the placement stage 30 are incident upon the incident surface 41. The detector 4 is configured by a scintillator unit that includes a commonly known scintillation substance, a photomultiplier tube, and a light receiving unit, and the like. The detector 4 converts the energy of X-rays incident on the incident surface 41 of the scintillator unit to light energy such as visible light, ultraviolet light, or the like, amplifies it with the photomultiplier tube, converts the amplified light energy to electric energy with the aforementioned light receiving unit, and outputs the electric energy as an electric signal to the control device 5. The detector 4 has a composition wherein the scintillator unit, the photomultiplier tube, and the light receiving unit are each divided into a plurality of pixels, and the pixels are arranged two dimensionally. Thus, an intensity distribution for the X-rays emitted from the X-ray source 2 and have passed through the specimen S can be acquired at one time. Incidentally, a predetermined range, for example, a range of approximately 90 to 95% of the total region of the incident surface 41 is the detection range, and a back projection image or the like of the specimen S described below is created based on the transmitted X-rays detected in the detection range. The size of the detection range is not limited to approximately 90 to 95% of the total region of the incident surface 41, and can be determined based on a balance between the maximum magnification image of the specimen S and the back projection image, and based on a range where the specimen S will not collide with the various components of the X-ray device 100 when generating a back projection image at maximum magnification, and the like. Furthermore, the size of the detection range can be set by the user to a desired size.

Note that the detector 4 may convert the energy of incident X-rays to electric energy and output it as an electric signal without converting to light energy. The detector 4 is not limited to those where the pixels are arranged two dimensionally. The detector 4 has an incident surface 41 that expands in the X-axis direction, for example, on a surface parallel to the XY plane, but the incident surface 41 can be configured by a line sensor where a single pixel is provided in the Y-axis direction. The arrangement direction of the line sensor pixels is not limited to the Y-axis direction, and the arrangement can be in the X-axis direction. Note that as the detector 4, a composition may be had wherein the scintillator unit is directly formed on the light receiving unit without providing a photomultiplier tube.

The frame 8 supports the X-ray source 2, the placement unit 3, and the detector 4. The frame 8 is constructed to have sufficient rigidity. Thus, it is possible to stably support the X-ray source 2, the placement unit 3, and the detector 4 while acquiring a captured image of the specimen S. The frame 8 is supported by the housing 1 through an anti-vibration mechanism 81 to prevent vibration generated on the outside from being transmitted as is to the frame 8.

The control device 5 has a microprocessor, surrounding circuits, and the like, and controls various units of the X-ray device 100 by reading and executing a control program stored beforehand on a storage medium not illustrated in the drawings, for example, flash memory or the like. The control device 5 is provided with an X-ray control unit 51, a movement control unit 52, an image generation unit 53, a preliminary inspection unit 54, a work memory 55, a region extracting unit 56, and a calculating unit 57. The X-ray control unit 51 controls the behavior of the X-ray source 2, and the movement control unit 52 controls the movement behavior of the manipulator 36. The image generating unit 53 generates an X-ray projection image based on the X-ray projection image data of the specimen S which is the detection data based on the electric signal output from the detector 4 based on the intensity of X-rays that pass through the specimen S. Furthermore, the image generating part 53 executes an image reconstruction process that generates a back projection image with regard to the electric signals output from the detector 4 based on the intensity of the X-rays that pass through the specimen S as the specimen S rotates through the predetermined angle in accordance with the rotation of the placement stage 30, and generates a three-dimensional image of the specimen S. Processes for generating the back projection image include a back projection method, filtered back projection method, iterative reconstruction method, and the like.

The preliminary inspection unit 54 controls the X-ray control unit 51, movement control unit 52, region extracting unit 56, and calculating unit 57, and executes the preliminary inspection. The preliminary inspection is performed in order to calculate the distance between the specimen S and the X-ray source 2, and to position the specimen S at the calculated distance, so that the maximum magnification of the specimen S can be generated in the back projection image. The region extracting unit 56 extracts the specimen region corresponding to the outer edge part of the specimen S as the specimen S rotates by the rotation of the placement stage 30 from the X-ray projection image data of the specimen S at different detected rotation positions. The calculating unit 57 calculates the change amount of the position in the Z-axis direction of the specimen S during preliminary inspection, in other words, the change amount of the distance in the Z-axis direction between the specimen S and the X-ray source 2, based on the specimen region that was extracted by the region extracting unit 56. The preliminary inspection unit 54 controls the movement control unit 52 to move the placement stage 30 in the Z-axis direction in accordance with the change amount calculated by the calculating unit 57. Incidentally, the details of the movement control unit 52 of the control device 5, image generation unit 53, preliminary inspection unit 54, region extracting unit 56, and calculating unit 57 are described below.

The work memory 55 is configured by volatile storage media, for example, and the X-ray projection image data generated by the image generation part 53 is stored temporarily.

The function of the X-ray device 100 is described below. The X-ray device 100 changes the distance in the Z-axis direction between the X-ray source 2 and the specimen S based on the specimen region extracted from the X-ray projection image data generated by irradiating from the X-ray source 2 during preliminary inspection. The X-ray device 100 changes the distance between the X-ray source 2 and the specimen S by preliminary inspection, and generates a back projection image from the X-ray projection image data generated by irradiating from the X-ray source 2 as the main inspection. The main functions of the X-ray device 100 during preliminary inspection are described below.

Preliminary Inspection

Preliminary inspection is performed prior to the main inspection. The preliminary inspection is performed in order to set the distance in the Z-axis direction between the X-ray source 2 and the placement stage 30 so that the specimen region can be a predetermined size on the detection surface 41 of the detector 4. The preliminary inspection of the present embodiment is performed by the following processes (1) to (4).

(1) Acquisition process of X-ray projection image data
(2) Extraction process of the specimen region
(3) Calculation process of the change amount
(4) Movement process of the specimen S based on the change amount The explanation is divided below into (1) to (4). Incidentally, the details about the specimen region and the change amount are described below.

(1) Acquisition Process of X-Ray Projection Image Data

The specimen S is placed on the placement stage 30 by the user, and when execution of preliminary inspection is instructed by operating an operating unit not illustrated in the drawings, the preliminary inspection unit 54 of the control unit 5 begins preliminary inspection of the specimen S. Incidentally, when the user places the specimen S on the placement stage 30, the aforementioned indicator or the like provided on the surface of the placement stage 30 is used as a landmark, and thus the specimen S can be placed such that the rotational center of the placement stage 30, or in other words the rotational axis Yr is essentially in line with the center of a projection image circumscribed circle when the specimen S is projected on the upper surface of the placement stage 30.

Figure 2:
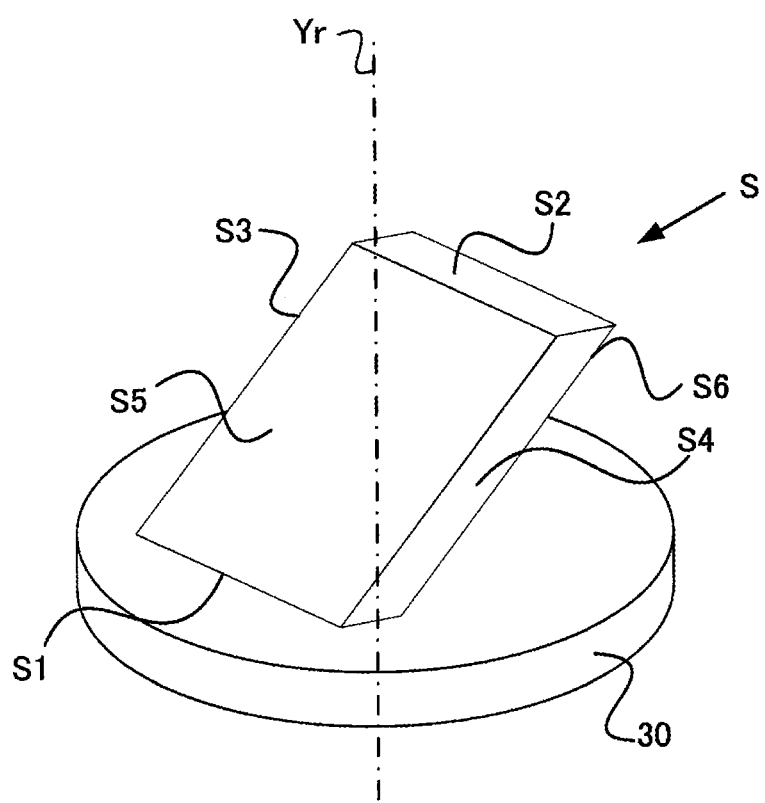
FIG. 2 is a diagram schematically illustrating the appearance of the specimen placed on a placement base.

FIG. 2 schematically illustrates an appearance diagram of an example of a specimen S placed on the placement stage 30. FIG. 2 illustrates a case where a flat plate member is placed as the specimen S having an incline with regard to the direction of the rotational axis Yr of the placement stage 30. Incidentally, for the case illustrated in FIG. 2, a jig or the like is actually used so that the specimen S will not tip over, but the jig or the like is not illustrated in FIG. 2. Incidentally, the jig in this embodiment is included in the inclusion region R1. In other words, if the jig is rotated around the rotational axis Yr, the region that the jig passes through at least one time will be included in the inclusion region R1. Naturally, if the jig rotates around the rotational axis Yr, the jig can protrude out of the inclusion region R1. In this case, the data related to the jig can be removed from the image. Furthermore, if the jig protrudes out of the inclusion region R1 when the jig is rotated around the rotational axis Yr, the region that combines both the inclusion region when the jig rotates around the rotational axis Yr and the inclusion region when the specimen S rotates around the rotational axis Yr is taken as the inclusion region. Furthermore, if the axes that connects the circular center of the cylindrical regions of the inclusion region of the jig and the inclusion region of the specimen S do not align, a cylindrical region can be set so as to include both cylindrical regions, and used as the inclusion region. The specimen S illustrated in FIG. 2 has mutually parallel planes S1 and S2, mutually parallel planes S3 and S4, and mutually parallel planes S5 and S6, and the specimen S is placed on the placement stage 30 such that the plane S1 is in contact with the placement stage 30.

The preliminary inspection unit 54 controls the X-ray control unit 51 and the movement control unit 52, and causes X-rays to irradiate from the X-ray source 2 while rotating the specimen S that was placed on the placement stage 30 as illustrated in FIG. 2. The detector 4 outputs X-ray projection image data for each predetermined rotational angle based on the transmitted X-rays irradiated from the X-ray source 2 and passed through the specimen S. Incidentally, the X-ray projection image data acquired during preliminary inspection may be less than the X-ray projection image data acquired for each rotational angle during the main inspection. In other words, the X-ray projection image data can be output from the detector 4 at larger rotational angles as compared to the case of the back projection image generated during the main inspection. Naturally, the X-ray projection image data acquired during preliminary inspection may be more than or the same as the X-ray projection image data acquired for each rotational angle during the main inspection. An example where the X-ray projection image data is acquired at rotational angles of 90° is described below.

Figure 3A:
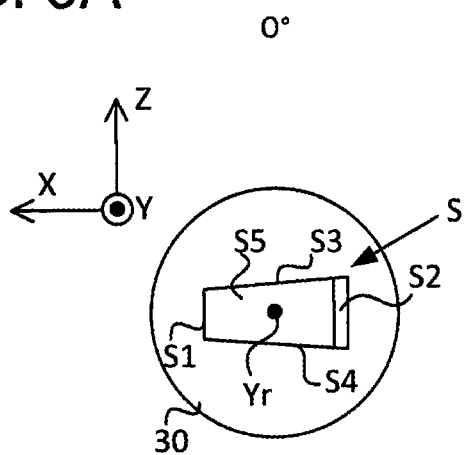
FIGS. 3A to 3D are diagrams schematically illustrating the appearance of the specimen placed on a placement base seen from above.
Figure 3B:
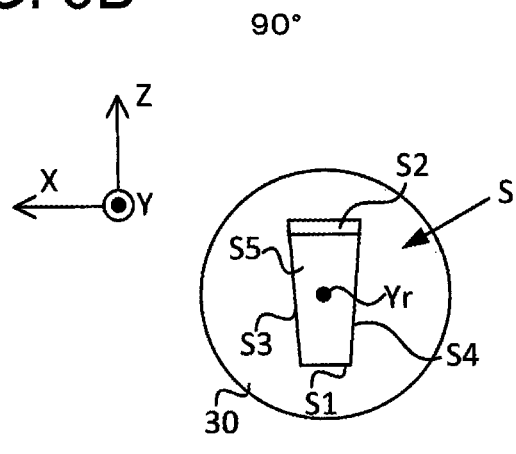
Figure 3C:
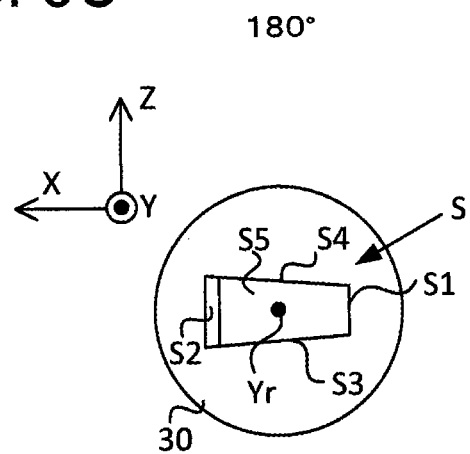
Figure 3D:
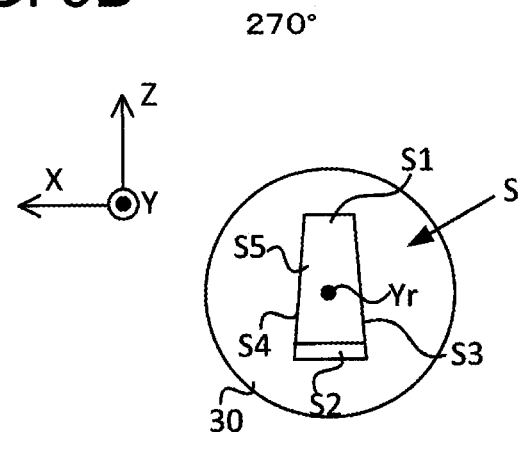

FIGS. 3A to 3D are diagrams schematically illustrating the case where the specimen S that was placed on the placement stage 30 as illustrated in FIG. 2 is seen from above, or in other words from the Y-axis+side. FIG. 3A illustrates the case where the specimen S is at 0° with regard to the optical axis direction of the X-ray source 2, or in other words the Z-axis; FIG. 3B illustrates the case where the specimen S has been rotated 90° with the placement stage 30 in a counterclockwise direction from the condition of FIG. 3A; FIG. 3C illustrates the case where the specimen S has been rotated 180° with the placement stage 30 in a counterclockwise direction from the condition of FIG. 3A; and FIG. 3D illustrates the case where the specimen S has been rotated 270° with the placement stage 30 in a counterclockwise direction from the condition of FIG. 3A. Incidentally, in the following explanation, the case where the plane S3 and plane S4 of the specimen S are orthogonal to the Z-axis as illustrated in FIG. 3A, is referred to as having an angle of 0° between the X-ray source 2 and the specimen S.

(2) Extraction Process of the Specimen Region

The region extracting unit 56 extracts the specimen region corresponding to the region that is included when the outer edge part of the specimen S rotates due to the rotation of the placement stage 30, from the X-ray projection image data using the X-ray projection image data acquired by the X-ray projection image data acquisition process.

Figure 4A:
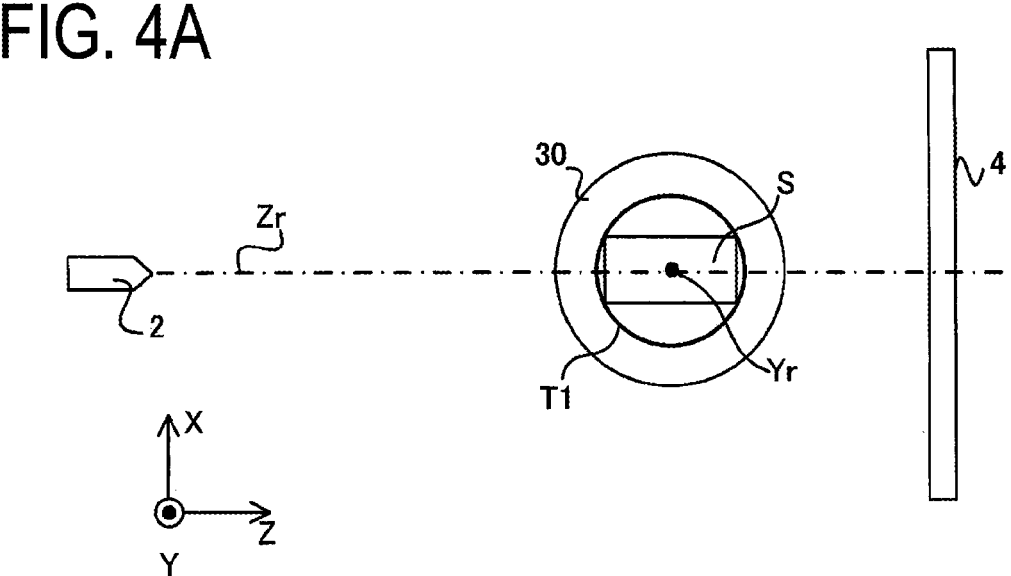
FIGS. 4A to 4C are diagrams schematically illustrating an inclusion region where the specimen is included by rotating the specimen.
Figure 4B:
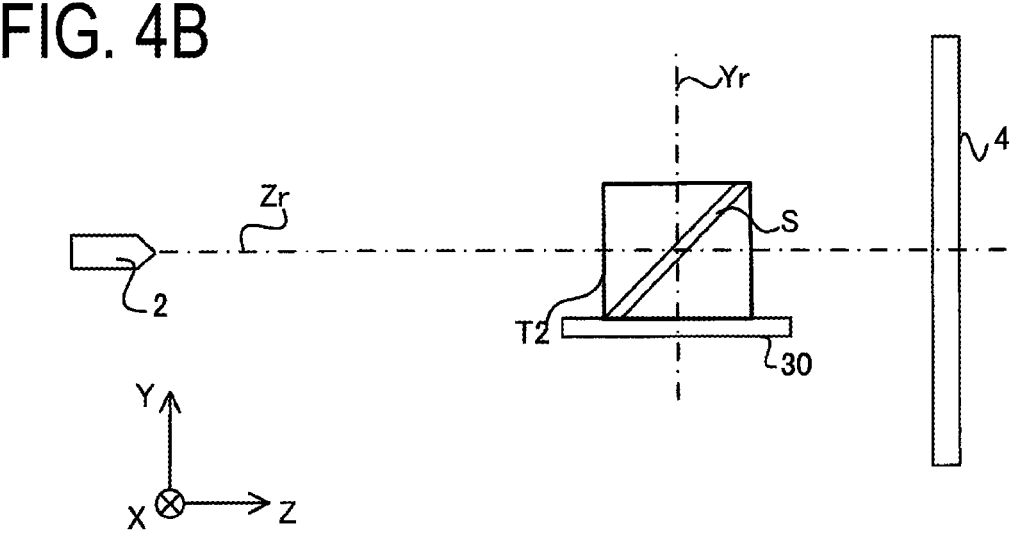
Figure 4C:
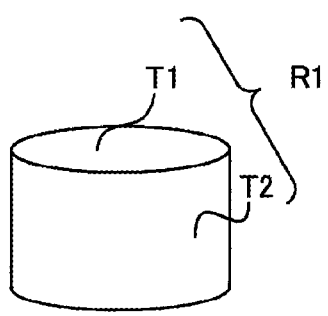

If the specimen S rotates on the placement stage 30 as illustrated in FIG. 3A to FIG. 3D, the inclusion region that includes the farthest portion from the center of rotation of the specimen S is illustrated in FIGS. 4A to 4C. FIG. 4A illustrates the space surrounded by a distant part when the most distant part from the rotational axis Yr in the XZ plane is rotated at corresponding positions in the Y-axis direction in a case where the specimen S rotates around the rotational axis Yr on the placement stage 30.

FIG. 4A representatively expresses the largest area of the surrounded space in the XZ plane at each position along the Y-axis direction as the first inclusion region T1. Incidentally, the region with the largest area at each position along the Y-axis direction is represented for extraction of the specimen region, but this is not a limitation. For example, the average area in the XZ plane at a plurality of positions along the Y-axis direction can be used, and naturally in this case, it is also acceptable to not use all of the plurality of positions along the Y-axis direction. Furthermore, the region with the largest area is represented for each position along the Y-axis direction, but it is also acceptable to apply a predetermined ratio such as 90% or the like, for example, to the area. If the predetermined ratio is 90%, the predetermined ratio can also be applied to the area centered around the rotational axis Yr, for example. Naturally, this also applies to the second inclusion region T2 described later. Therefore, the inclusion region R1 is determined based on the first inclusion region T1 and the second inclusion region T2. Therefore, the inclusion region R1 will differ based on the first inclusion region T1 and the second inclusion region T2 that is set.

FIG. 4A is a diagram schematically illustrating the first inclusion region T1 as seen from above, or in other words from the Y-axis+side. The inclusion region T1 is circular centered around the rotational axis Yr. FIG. 4B is a diagram schematically illustrating the second inclusion region T2 for the case where a cylindrical shape is viewed from the X-axis-side, where the two inclusion regions T1 in FIG. 4rA, or in other words the first inclusion region T1 on the Y-axis+side and the first inclusion region T1 on the Y-axis-side are the top surface and bottom surface. As illustrated in FIG. 4B, the second inclusion region T2 is rectangular with the outermost edge part of the specimen S where the distance from the intersecting point between the rotational axis Yr and the optical axis Zr is the largest set as the diagonal. In other words, if the specimen S is rotated in conjunction with the placement stage 30, the specimen S will be included inside a cylindrical region as illustrated in FIG. 4C at any rotational position. With the present embodiment, when the specimen S is placed on the placement stage 30 as illustrated in FIGS. 4A to 4C and then the specimen S is rotated 360° around the rotational axis Yr, the region that the specimen S passes through at least one time is indicated by the first inclusion region T1 and the second inclusion region T2. Incidentally, with the present embodiment, an example where the specimen S was rotated 360° was described, but the angle of rotation is not limited, and for example, a region where the rotation was 300° can also be used. Furthermore, a region where the specimen S was rotated 180° can be calculated, and then the inclusion region for the case of 360° rotation can be calculated from the region of 180° rotation.

The region extraction unit 56 extracts the two-dimensional region corresponding to the projection region as the specimen region when the aforementioned inclusion region R1 is projected on the incident surface 41 of the detector 4 which is a plane parallel to the XY plane, by the procedures described below. In other words, the region extraction unit 56 performs differential processing using a Sobel filter or the like along the horizontal direction, or in other words along the X-axis direction, for example, with regard to the X-ray projection image data acquired when the angle between the X-ray source 2 and the specimen S is 0°, 90°, 180°, and 270°. By this processing, the region extraction unit 56 specifies a boundary where the change in the intensity data of the X-rays detected by the detector 4 becomes steep, in all of the X-ray projection image data. This boundary corresponds to an end part of the specimen S in all of the X-ray projection image data. Synthesized data, composited data or integrated data is generated by synthesizing, compositing or integrating the X-ray projection image data after performing differential processing, and the specimen region is extracted by performing a binarizing process on the synthesize data.

Incidentally, with the present embodiment, the region extraction unit 56 determined that the boundary where there was a steep change in the intensity data of the X-rays detected by the detector 4 was the end part of the specimen S, but there is no limitation to this example. For example, there are cases where a layer covered by the surface of the specimen S is difficult to detect with regard to the inside of the specimen S. In this case, the boundary where the change in the intensity of the X-rays detected by the detector 4 becomes steep and the position of the end part of the specimen S do not align. Therefore, a position that differs from the boundary detected by the detector 4 can be used as the end part of the specimen S. In other words, the region extraction unit 56 may extract a region that is larger than the detected region as the specimen region. Furthermore, if the material of the surface of the specimen S is soft and it is acceptable for the specimen S and the X-ray source 2 to come in contact, the region extraction unit 56 may extract a region that is smaller than the specimen region that was detected as the specimen region. The region extraction unit 56 extracts the specimen region by specifying a boundary corresponding to an end part of the specimen S by extracting the contour from the synthesized data, but there is no limitation to this.

Figure 5A:
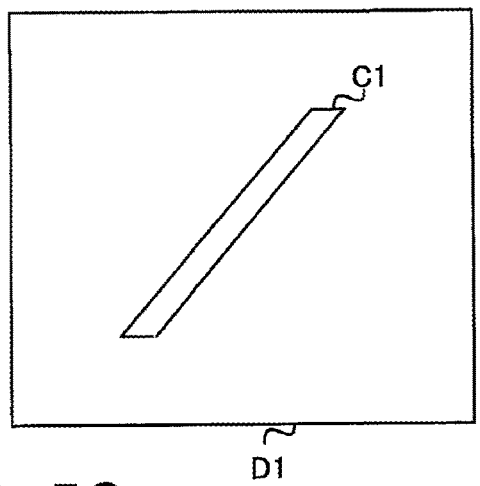
FIGS. 5A to 5E are diagrams schematically illustrating a contour of the specimen detected in the X-ray projection image data acquired when the angle between the X-ray source and the specimen is 0°, 90°, 180°, and 270°.
Figure 5B:
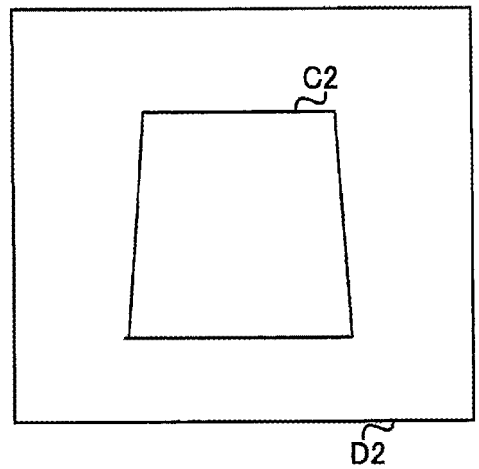
Figure 5C:
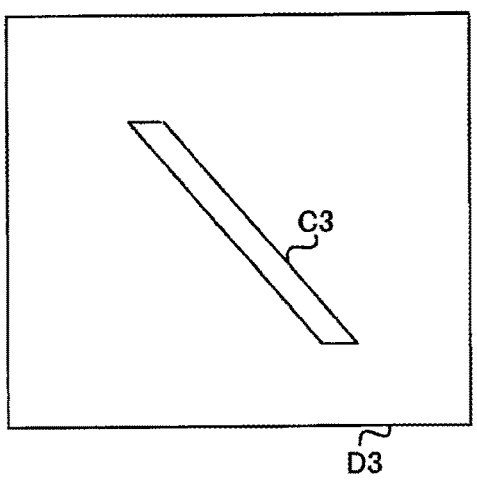
Figure 5D:
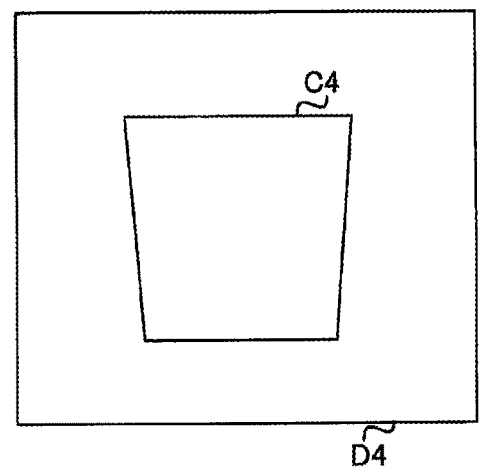

FIGS. 5A to 5E schematically illustrate a contour C of X-ray projection images D1 to D4 corresponding to the X-ray projection image data detected by the detector 4 when the angle between the X-ray source 2 and the specimen S is 0°, 90°, 180°, or 270°. Incidentally, in FIGS. 5A to 5E, the X-ray projection images D1, D2, D3, and D4 correspond to the cases where the angle between the X-ray source 2 and the specimen S is 0°, 90°, 180°, and 270°. FIG. 5A illustrates the contour C1 of the X-ray projection image when the angle between the X-ray source 2 and the specimen S is 0°. FIG. 5B illustrates the contour C2 of the X-ray projection image when the angle between the X-ray source 2 and the specimen S is 90°. FIG. 5C illustrates the contour C3 of the X-ray projection image when the angle between the X-ray source 2 and the specimen S is 180°. FIG. 5D illustrates the contour C4 of the X-ray projection image when the angle between the X-ray source 2 and the specimen S is 270°.

Figure 5E:
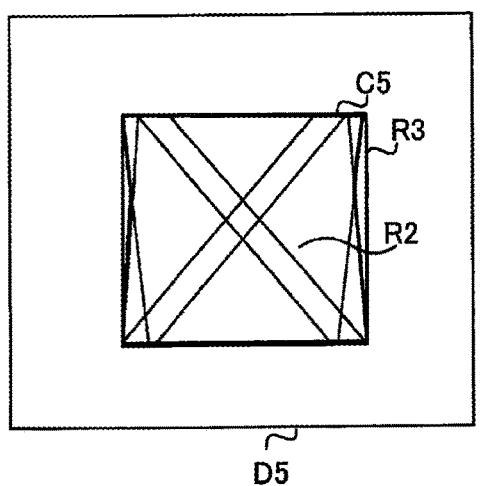

The region extraction unit 56 synthesizes the X-ray projection image data from which the contours C1 to C4 were detected to generate synthesized data, and performs binary processing. When generating the synthesized data, the region extraction unit 56 performs synthesis such that the position of the detector 4 does not change, with regard to all of the X-ray projection image data. Incidentally, in the present embodiment, the X-ray projection image data is synthesized with reference to the rotational axis Yr when acquiring the X-ray projection image of FIG. 5A to FIG. 5D. The reference when synthesizing the X-ray projection image data is not limited to this. For example, the X-ray projection image data may be combined such that of the various contours, the position of the contours of the region placed on the placement stage 30 are aligned in the Y direction. FIG. 5E schematically illustrates a synthesized image D5 and contours C1 to C4 corresponding to the synthesized data after binary processing. FIG. 5E illustrates a state in which the contours C1 to C4 are overlapped. In FIG. 5E, the contours of the synthesized image obtained by overlapping the contours C1 to C4 on the XY plane is represented as C5. The region surrounded by the contour C5 is extracted as the specimen region R2 by the region extracting unit 56. The inclusion region R1 described above is set by a side which has the longest distance in the direction parallel to the X-axis direction, and the side which has the longest distance parallel to the Y-axis direction, of the specimen region R2 in the XY plane. In other words, the specimen region R2 is included in the region where the inclusion region R1 was projected on the incident surface 41 of the detector 4.

Note that the region extracting unit 56 is not limited to one that performs binary processing on the synthesized data that was generated, and synthesize data can be generated by synthesizing after performing binary processing on the differential process X-ray projection image data. Alternatively, the region extracting unit 56 can synthesize the X-ray projection image data to generate synthesize data, and then perform differential processing and binary processing on the synthesize data.

(3) Calculation Process of the Change Amount

Based on the position in the Z-axis direction of the specimen S at the time of the preliminary examination and the size of the inclusion region R1 on the detector 4, the calculating unit 57 calculates the change amount for changing the distance in the Z-axis direction of the X-ray source 2 and the specimen S in main inspection. For example, there are cases where there is a desire to shorten the distance in the Z-axis direction between the X-ray source 2 and the specimen S, and to increase the size of the specimen S. In this case, for example, when the resolution of the detector 4 is fixed by the magnification, if the projected image of the specimen S on the detector 4 is enlarged, the internal structure can be inspected with higher resolution. In this case, if the distance in the Z-axis direction between the X-ray source 2 and the specimen S is shortened, collision may occur between the X-ray source 2 and the specimen S. Furthermore, there are cases where there is a desire to lengthen the distance between the X-ray source 2 and the specimen S in order to inspect the specimen S. In this case, for example, the size of the specimen S will be large, and the specimen S can be inspected with a fewer number of inspection times. At this time, there is a possibility that the specimen S and the detector 4 will collide. Furthermore, at this time, there is also a possibility that the specimen S, and the X-ray source 2 and the detector 4 will collide. In order to prevent the occurrence of measurement defects due to collision between the structure of the X-ray device 100 and the specimen S as described above, the calculating unit 57 calculates the change amount in the position of the specimen S in preliminary inspection in order to change the distance in the Z-axis direction of the X-ray source 2 and the specimen S in main inspection, based on the position in the Z-axis direction of the specimen S at the time of the preliminary inspection and the size of the specimen region R2 on the detector 4.

Incidentally, with the present embodiment, the distance in the Z-axis direction between the X-ray source 2 and the specimen S at the time of the main inspection is changed based on the size of the specimen region R2, but the distance in the Z-axis direction between the X-ray source 2 and the detector 4 at the time of the main inspection may be changed based on the size of the inclusion region R1. Naturally, the size of the specimen region R2 or the size of the inclusion region R1 will change, and the distance in the Z-axis direction between the X-ray source 2 and the specimen S may also change based on the size of the aforementioned change. For example, the size of the specimen region R2 may be expanded to 110%, and based upon the expanded region the distance in the Z-axis direction between the X-ray source 2 and the specimen S may be changed. Furthermore, for example, the size of the specimen region R2 may be shrunk to 90% and based upon the shrunk region the distance in the Z-axis direction between the X-ray source 2 and the specimen S may be changed.

Calculation of the change amount is described below in detail.

Figure 6A:
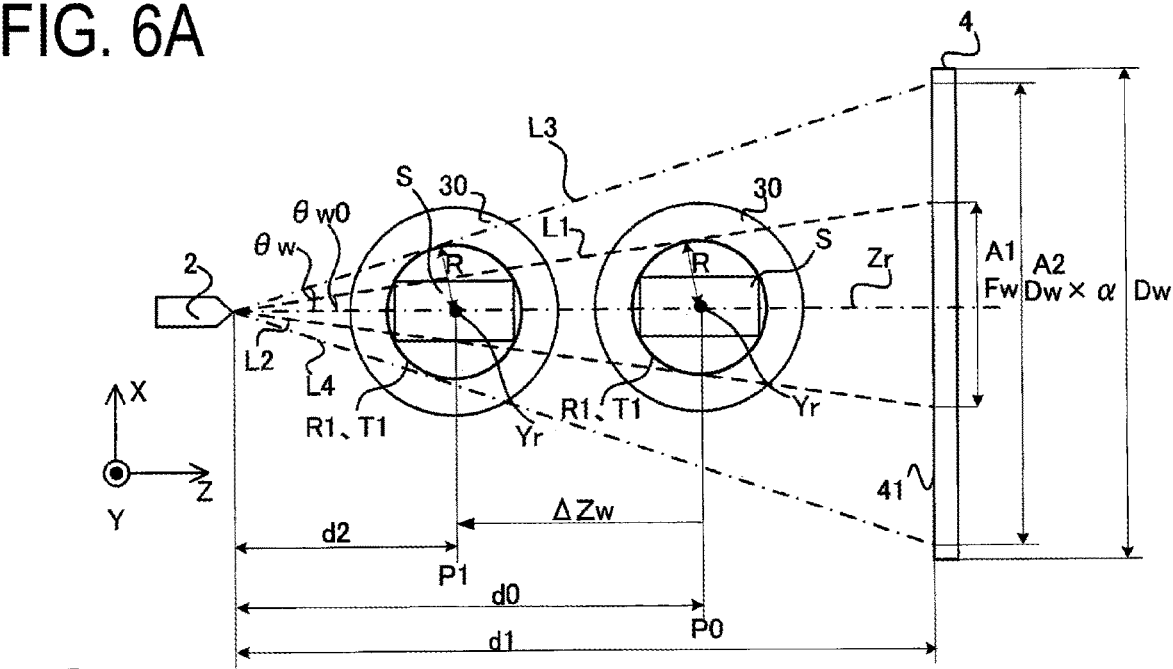
FIGS. 6A and 6B are diagrams schematically illustrating the positional relationship between the X-ray source, the inclusion region of the specimen, and the detector, in order to describe the concept for calculating the change amount.
Figure 6B:
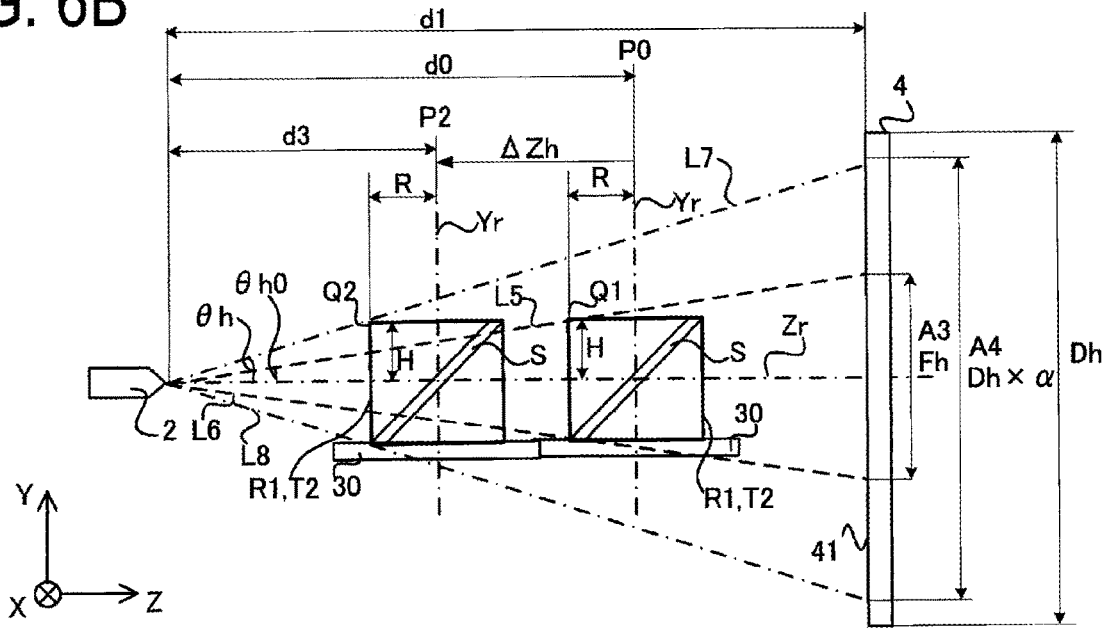

The concept for calculating the change amount is described while referring to FIGS. 6A and 6B. FIG. 6A is a diagram schematically illustrating the positional relationship between the X-ray source 2, the first inclusion region T1 of the specimen S, and the detector 4, as seen from above, or in other words from the Y-axis+side. First, the case where the specimen S is at a position P0 in the Z-axis direction is described. Incidentally, the rotational position of the specimen S corresponds to the condition illustrated in FIG. 4A. Of the irradiation region of X-rays emitted from the X-ray source 2, the X-rays that pass through the range enclosed by L1 and L2 illustrated by the dash line in FIG. 6A will pass through the inclusion region R1 of the specimen S, and will enter the detector 4. As a result, the X-rays that pass through the aforementioned inclusion region R1 will enter the incident range A1 in the X-axis direction illustrated in FIG. 6A on the incident surface 41 of the detector 4.

Next, the case where the specimen S is at a position P1 closer to the X-ray source 2 than position P0 in the Z-axis direction is described. In this case, the X-rays that pass through the range enclosed by L3 and L4 illustrated by the single dot dash line in FIG. 6A will pass through the inclusion region R1 of the specimen S, and will enter the detector 4. As a result, the X-rays that pass through the aforementioned inclusion region R1 will enter the incident range A2 in the X-axis direction illustrated in FIG. 6A on the incident surface 41 of the detector 4. Therefore, the projection magnification on the detector 4 by the specimen S will be larger when the specimen S is at P1, as compared to the case where the specimen S is at P0. In other words, higher resolution can be achieved during main inspection when the specimen S is at P1 as compared to when the specimen S is at P0. When the incident range A2 in the X-axis direction toward the detector 4 is in line with the total region Dw in the X-axis direction of the detector 4, or in other words, when maximum projection magnification is achieved in the X-axis direction, the position in the Z-axis direction of the specimen S will be at P1x. P1x is a position that is closer to the Z-axis–side than P1 illustrated in FIG. 6A, or in other words, closer to the X-ray source 2.

FIG. 6B is a diagram schematically illustrating the positional relationship between the X-ray source 2, the inclusion region R1 of the specimen S, and the detector 4, as seen from the X-axis–side. First, the case where the specimen S is at a position P0 on the Z-axis is described. Incidentally, the rotational position of the specimen S corresponds to the condition illustrated in FIG. 4B. Of the irradiation region of X-rays emitted from the X-ray source 2, the X-rays that pass through the range enclosed by L5 and L6 illustrated by the dash line in FIG. 6B will pass through the inclusion region R1 of the specimen S, and will enter the detector 4. As a result, the X-rays that pass through the aforementioned inclusion region R1 will enter the incident range A3 in the Y-axis direction on the incident surface 41 of the detector 4.

Next, the case where the specimen S is at a position P2 closer to the X-ray source 2 than position P0 in the Z-axis direction is described. In this case, the X-rays that pass through the range enclosed by L7 and L8 illustrated by the single dot dash line in FIG. 6B will pass through the inclusion region R1 of the specimen S, and will enter the detector 4. As a result, the X-rays that pass through the aforementioned inclusion region R1 will enter the incident range A4 in the Y-axis direction illustrated in FIG. 6B on the incident surface 41 of the detector 4. Therefore, the projection magnification on the detector by the specimen S will be larger when the specimen S is at P3, as compared to the case where the specimen S is at P0. In other words, higher resolution can be achieved during main inspection when the specimen S is at P2 as compared to when the specimen S is at P0. When the incident range A4 in the Y-axis direction toward the detector 4 is in line with the total region Dh in the Y-axis direction of the detector 4, or in other words, when maximum projection magnification is achieved in the Y-axis direction, the position in the Z-axis direction of the specimen S will be at P2y. P2y is a position that is closer to the Z-axis–side than P2 illustrated in FIG. 6B, or in other words, closer to the X-ray source 2.

Next, assuming that P2y is farther from the X-ray source 2 than P1x, the example will be described where the position of the specimen S is changed in order to set the projection magnification of the specimen S to the maximum magnification without protruding the X-ray projection image of the specimen S from the whole area of the incident surface 41 of the detector 4. In the case where the specimen S is moved to position P1x where the distance from the X-ray source 2 is shorter than P2y, of the X-rays that pass through the inclusion region R1 of the specimen S, a portion of the X-rays will reach the outer part of the entire region Dh in the Y-axis direction of the detector 4. Therefore, in this case, a back projection image of the entire specimen S cannot be obtained.

On the other hand, if the specimen S is positioned at P2y that is farther from the X-ray source 2 than P1x, the X-rays that have passed through the inclusion region R1 of the specimen 2 can enter across the entire region Dh in the Y-axis direction of the detector 4. Furthermore, the X-rays that passed through the inclusion region R1 of the specimen S in the X-axis direction can enter into the region that is narrower than the entire region Dw in the X direction of the detector 4. Therefore, in the example illustrated in FIGS. 6A and 6B, position P2y is the position of the specimen S where the maximum projection magnification can be obtained.

Based upon the above-mentioned concept, the calculating unit 57 calculates the change amount of the distance in the Z-axis direction, or in other words the position of the specimen S, using the specimen region R2 that was extracted.

Incidentally, with the present embodiment, the aforementioned 90 to 95% range can be used as the detection range from the entire region of the incident surface 41 of the detector 4. In other words, with the present embodiment, the change amount of the position of the specimen S, or in other words the distance in the Z-axis direction is calculated so that the inclusion region R1 is projected in the detection range of the detector 4. Furthermore, in the following description, the maximum projection magnification when the inclusion region R1 is projected in the detection range is referred to as the effective maximum magnification.

Figure 7:
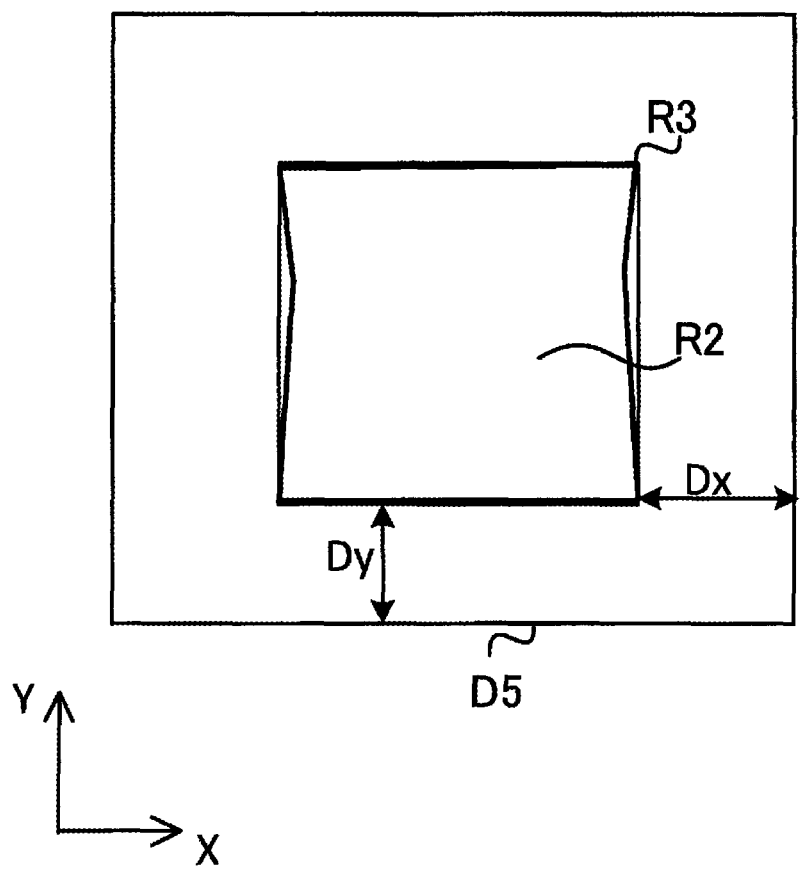
FIG. 7 is a diagram schematically illustrating the specimen region that was extracted from the synthesis data.

FIG. 7 schematically illustrates specimen region R2 on the synthesized image D5 corresponding to the synthesized data, extracted by the region extracting unit 56. FIG. 7 schematically illustrates a rectangular region R3 that circumscribes the specimen region R2. This rectangular region R3 is a region where the inclusion region R1 is projected on the detector 4. The calculating unit 57 calculates the shortest distance Dx in the X-axis direction of the distances from the outer edge part of the specimen region R2, or in other words to the limit of the detection range of the detector 4 from the rectangular region R3. Similarly, the calculating unit 57 calculates the shortest distance Dy in the Y-axis direction of the distances from the outer edge part of the specimen region R2, or in other words to the limit of the detection range of the detector 4 from the rectangular region R3. In FIG. 7, the distance from the outer edge part in the X-axis+direction to the limit of the detection range is Dx, and the distance from the outer edge part in the Y-axis−direction to the limit in the detection range is Dy.

Figure 8:
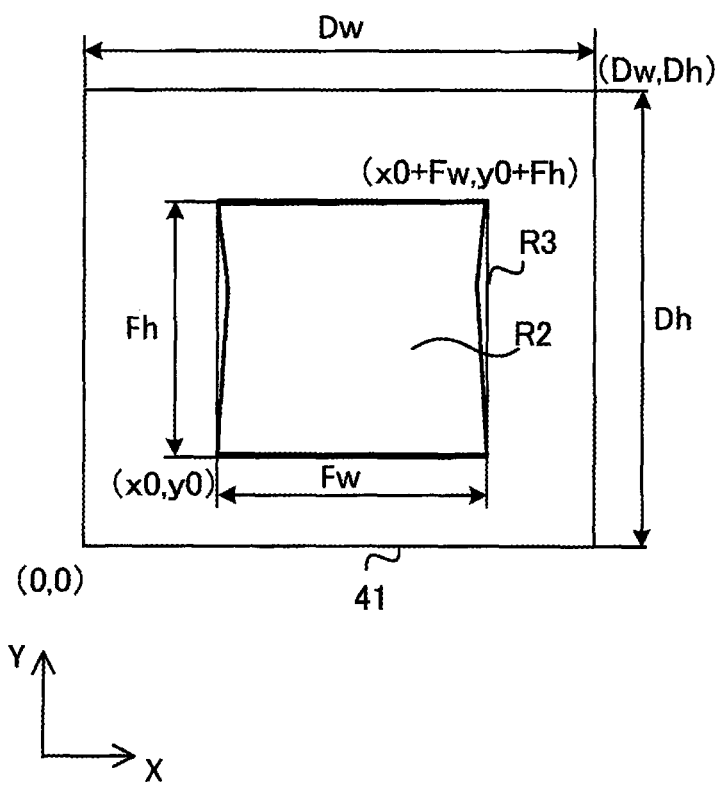
FIG. 8 is a diagram describing calculation of the change amount when the center of the specimen region does not match the center of the synthesized data.

Next, the calculation procedures for the change amount $\Delta Z$ in the Z-axis direction of the position of the specimen S is described below in detail while referring to FIG. 8. First, the calculating unit 57 calculates a first changeable amount $\Delta Zw$ based on the ratio between the length of the segment Fw in the X-axis direction of the specimen region R2 and the length in the X-axis direction of the detection range of the detector 4. Incidentally, the length in the X-axis direction of the detection range of the detector 4 is the value $Dw \times \alpha$ where the coefficient $\alpha$ is multiplied by the total region Dw in the X-axis direction of the incident surface 41 of the detector 4. Next, the calculating unit 57 calculates a second changeable amount $\Delta Zh$ based on the ratio between the length of the segment Fh in the Y-axis direction of the specimen region R2 and the length in the Y-axis direction of the detection range of the detector 4. Incidentally, the length in the Y-axis direction of the detection range of the detector 4 is the value $Dh \times \alpha$ where the coefficient $\alpha$ is multiplied by the total region Dh in the Y-axis direction of the incident surface 41 of the detector 4. Incidentally, the aforementioned a is the ratio that is used as the detection range for the incident surface 41 of the detector 4, and as described above, is generally 90 to 95%, or in other words a value of 0.9 to 0.95.

Next, the calculating unit 57 performs processing for matching the center of the specimen region R2 to the center of the incident surface 41 of the detector 4. As illustrated in FIG. 8, an orthogonal coordinate system is set so as to be (0,0) in a left lower end portion of the incident surface 41 of the detector 4. Therefore, a coordinate of a right upper end portion of the incident surface 41 is (Dw, Dh). A coordinate of a left lower portion of the specimen region R2 is assumed (x0, y0), and a coordinate of a right upper portion is assumed (x0+Fw, y0+Fh). Herein, the calculating unit 57 assumes that the specimen region R2 is distributed to the left and right with regard to the center of the incident surface 41 in the X-axis direction. In other words, the calculating unit 57 sets x0=(Dw−Fw)/2. The calculating unit 57 assumes that the specimen region R2 is vertically distributed with regard to the center of the incident surface 41 in the Y-axis direction. In other words, the calculating unit 57 sets y0=(Dh−Fh)/2. Next, the calculating unit 57 performs calculation of a first changeable amount $\Delta Zw$ and second changeable amount $\Delta Zh$ as described below. Note that the value of (Dh−Fh)/2 in the Y-axis direction is used when the placement stage 30 moves in the Y-axis direction as described hereinafter.

Calculation of the first changeable amount $\Delta Zw$ will be described while referring to FIG. 6A and FIG. 8. As illustrated in FIG. 6A, a distance from the X-ray source 2 to the specimen S in the Z-axis direction is set to d0 at a position P0 of the specimen S during preliminary inspection. Furthermore, a distance between the X-ray source 2 and detector 4 in the Z-axis direction is set to d1. Furthermore, a distance from the X-ray source 2 to the specimen S when an effective maximum magnification is implemented in the X-axis direction, in other words, when the specimen S is at position P2 is set to d2. The ratio of d0 and d2 is equal to the ratio of Fw and $Dw \times \alpha$, and therefore, a relationship of $d2/d0 = Fw/(Dw \times \alpha)$ is established. Therefore, d2 is expressed by Equation (1) below.

$$d2 = Fw/(Dw \times \alpha) \times d0 \qquad (1)$$

Next, the first changeable amount $\Delta Zw$ is expressed by Equation (2) below.

$$\Delta Zw = d0 - d2 \qquad (2)$$

Thereby, the first changeable amount $\Delta Zw$ is calculated by Equation (3) below, based on Equation (1) and Equation (2).

$$\Delta Zw = d0\{1 - Fw/(Dw \times \alpha)\} \qquad (3)$$

Calculation of the first changeable amount $\Delta Zw$ can be considered as follows. As illustrated in FIG. 6A, an angle $\theta w0$ formed by X-ray L1 and the Z axis during preliminary inspection is expressed by Equation (4) below, based on a distance d1 between the X-ray source 2 and detector 4 and the length Fw in the X-axis direction of the specimen region R2.

$$\theta w0 = \tan^{-1}\{(Fw/2)/d1\} \qquad (4)$$

As illustrated in FIG. 6A, an angle $\theta w$ formed by Z axis and X-ray L3 when an effective maximum magnification is achieved in the X-axis direction is expressed by Equation (5) below, based on the distance d1 between the X-ray source 2 and detector 4 and the length $Dw \times \alpha$ in the detection range of the detector 4.

$$\theta w = \tan^{-1}\{(Dw \times \alpha/2)/d1\} \qquad (5)$$

When an effective maximum magnification is achieved in the X-axis direction, the specimen region R2 contacts the X-rays L3 and L4. Therefore, the relationship between radius R of the inclusion region R1 and the distance d2 from the X-ray source 2 to the specimen S at this time can be expressed by Equation (6) below.

$$d2 = R/\sin \theta w$$

$$R = d0 \times \sin \theta w0 \qquad (6)$$

Therefore, the calculating unit 57 calculates the first changeable amount $\Delta Zw$ using Equation (7) below based on the aforementioned Equations (4) to (6).

$$\Delta Zw = d0 - d2 = d0 - R/\sin\theta w = d0 \times \{1 - Fw/(Dw \times \alpha)\} \qquad (7)$$

In other words, the calculating unit 57 calculates the first changeable amount $\Delta Zw$ based on the ratio between the length Fw in the X-axis direction of the specimen region R2 and the length $Dw \times \alpha$ in the X-axis direction of the detection range on the incident surface 41.

Next, calculation of the second changeable amount $\Delta Zh$ will be described while referring to FIG. 6B and FIG. 8. As illustrated in FIG. 6B, a distance from the X-ray source 2 to the specimen S when an effective maximum magnification is implemented in the Y-axis direction, in other words, when the specimen S is positioned at P2 is set to d3. In the present embodiment, cone beam or fan beam X-rays are emitted, and therefore, the second changeable amount ΔZh is calculated based on the position where X-rays passing through an outer end portion Q1 or Q2 on the X-ray source 2 side of the inclusion region R1 is incident upon the incident surface 41. The inclusion region R1 has a cylindrical shape of radius R in the X-axis direction as described above, and therefore, a distance from the X-ray source 2 to the outer end portion Q1 in the Z-axis direction is d0−R, and a distance from the X-ray source 2 to the outer end portion Q2 in the Z-axis direction is d3−R. The ratio between d0−R and d3−R is equal to the ratio between Fh and Dh×α, and therefore, a relationship of (d3−R)/(d0−R)=Fh/(Dh×α) is established. Therefore, d3 is expressed by Equation (8) below.

$$d3 = Fh/(Dh \times \alpha) \times (d0-R) + R \qquad (8)$$

Next, the second changeable amount ΔZh is expressed by Equation (9) below.

$$\Delta Zh = d0 - d3 \qquad (9)$$

Thereby, the second changeable amount ΔZh is calculated by Equation (10) below, based on Equation (8) and Equation (9).

$$\Delta Zh = (d0-R) \times \{1 - Fh/(Dh \times \alpha)\} \qquad (10)$$

Note that the same concept as the concept described using Equations (4) to (7) for calculating the first changeable amount ΔZw can also be applied to the second changeable amount ΔZh. An angle θh0 formed by the Z axis and X-ray L5 during preliminary inspection is expressed by Equation (11) below, based on the distance d1 between the X-ray source 2 and detector 4 and the length Fh in the Y-axis direction of the rectangular region R10.

$$\theta h0 = \tan^{-1}\{(Fh/2)/d1\} \qquad (11)$$

As illustrated in FIG. 6B, an angle θh formed by the Z axis and X-ray L7 when an effective maximum magnification is achieved in the Y-axis direction is expressed by Equation (12) below, based on the distance d1 between the X-ray source 2 and detector 4 and length Dh×α in the Y-axis direction in the detection range of the detector 4.

$$\theta h = \tan^{-1}\{(Dw \times \alpha/2)/d1\} \qquad (12)$$

As described above, second changeable amount ΔZh needs to be calculated in the Y-axis direction, based on the position where X-rays passing through an outer end portion Q1 or Q2 on the X-ray source 2 side of the inclusion region R1 is incident upon the incident surface 41. The length H from the center of the inclusion region R1 to the outer end portion Q1 of the inclusion region R1 in the Y-axis direction can be expressed as in Equation (13), based on the distance d0−R from the X-ray source 2 to the most X-ray source 2 side of the inclusion region R1, and the angle θh0 formed by the Z axis and X-ray L5.

$$H = (d0-R) \times \tan \theta h0 \qquad (13)$$

The value of H is the size of the specimen S in the Y-axis direction, and therefore is the same value even if the specimen S is moved to position P2. If the specimen S is moved to position P2, the distance d3−R from the X-ray source 2 to the outer end portion on the most X-ray source 2 side of the inclusion region R1 along the Z-axis direction is expressed as in Equation (14) below.

$$d3 - R = H/\tan \theta h \qquad (14)$$

Thereby, the distance d3 from the X-ray source 2 to the specimen S at position P2 is expressed as in Equation (15).

$$d3 = (H/\tan \theta h) + R \qquad (15)$$

Therefore, the calculating unit 57 calculates the second changeable amount ΔZh using Equation (16) below based on Equations (11) to (15).

$$\Delta Zh = \qquad (16)$$
$$d0 - d3 = d0 - \{(H/\tan\theta h) + R\} = (d0 - R) \times \{1 - Fh/(Dh \times \alpha)\}$$

In other words, the calculating unit 57 calculates the second changeable amount ΔZh based on the ratio between the length Fh in the Y-axis direction of the specimen region R2 and the length Dh×α in the Y-axis direction of the detection range on the incident surface 41.

The calculating unit 57 compares the first changeable amount ΔZw and second changeable amount ΔZh calculated by the aforementioned Equation (3) or Equation (7), and Equation (10) or Equation (16). As a result of comparing, the calculating unit 57 determines the smaller value to be the change amount ΔZ of the distance between the X-ray source 2 and specimen S. With the example illustrated in FIGS. 6A and 6B, the calculating unit 57 uses the second changeable amount ΔZh as the change amount ΔZ. In other words, the calculating unit 57 calculates the change amount ΔZ based on the ratio between length of the specimen region R2 along the smaller value of the distances Dx and Dy illustrated in FIG. 7, and the length of the detection range of the detector 4.

(4) Movement Process of the Specimen S Based on the Change Amount

When the change amount ΔZ is calculated by the calculating unit 57, the movement control unit 52 controls the manipulator unit 36 to move the placement stage 30. For placement stage 30 movement, first, the movement control unit 52 moves the placement stage 30 in the Y-axis direction. In this case, the movement control unit 52 determines a driving amount of the manipulator unit 36 based on the difference between y0 and (Dh−Fh)/2 described above. By moving the placement stage 30 in the Y-axis direction, in a back projection image acquired during the main inspection, the rectangular region 10 can be positioned in the center of the back projection image in the Y-axis direction.

After the placement stage 30 is moved in the Y-axis direction, the movement control unit 52 moves the placement stage 30 in the Z-axis direction to change the distance between the specimen S and X-ray source 2. In this case, the movement control unit 52 determines the driving amount of the manipulator unit 36 based on the change amount ΔZ. Therefore, for the specimen S, an image of the entire specimen S at an effective maximum magnification in the detection range of the detector 4 on the generated back projection image, and the specimen S is moved to a position that does not impact or contact the portions of the X-ray device 100 during the main inspection.

After the placement stage 30 is moved by the manipulator unit 36 to a position where the main inspection is performed, the X-ray device 100 performs the main inspection on the specimen S. In other words, an image reconstruction process is performed with regard to the electrical signals output from the detector 4 based on the intensity of the X-rays that pass through the specimen S as the specimen S rotates through the predetermined angle in accordance with the rotation of the placement stage 30. In this case, X-ray projection image data of the specimen S is generated from the electrical signals output from the detector 4 as the specimen rotates at a smaller angle than during preliminary inspection, a back projection image is generated from the X-ray projection image data of the specimen S at a different detected rotation position, and a three-dimensional image that expresses the internal structure or cross-sectional structure of the specimen S is generated. The generated three-dimensional image is displayed on the display monitor 6, and then stored in a storage medium.

Figure 9:
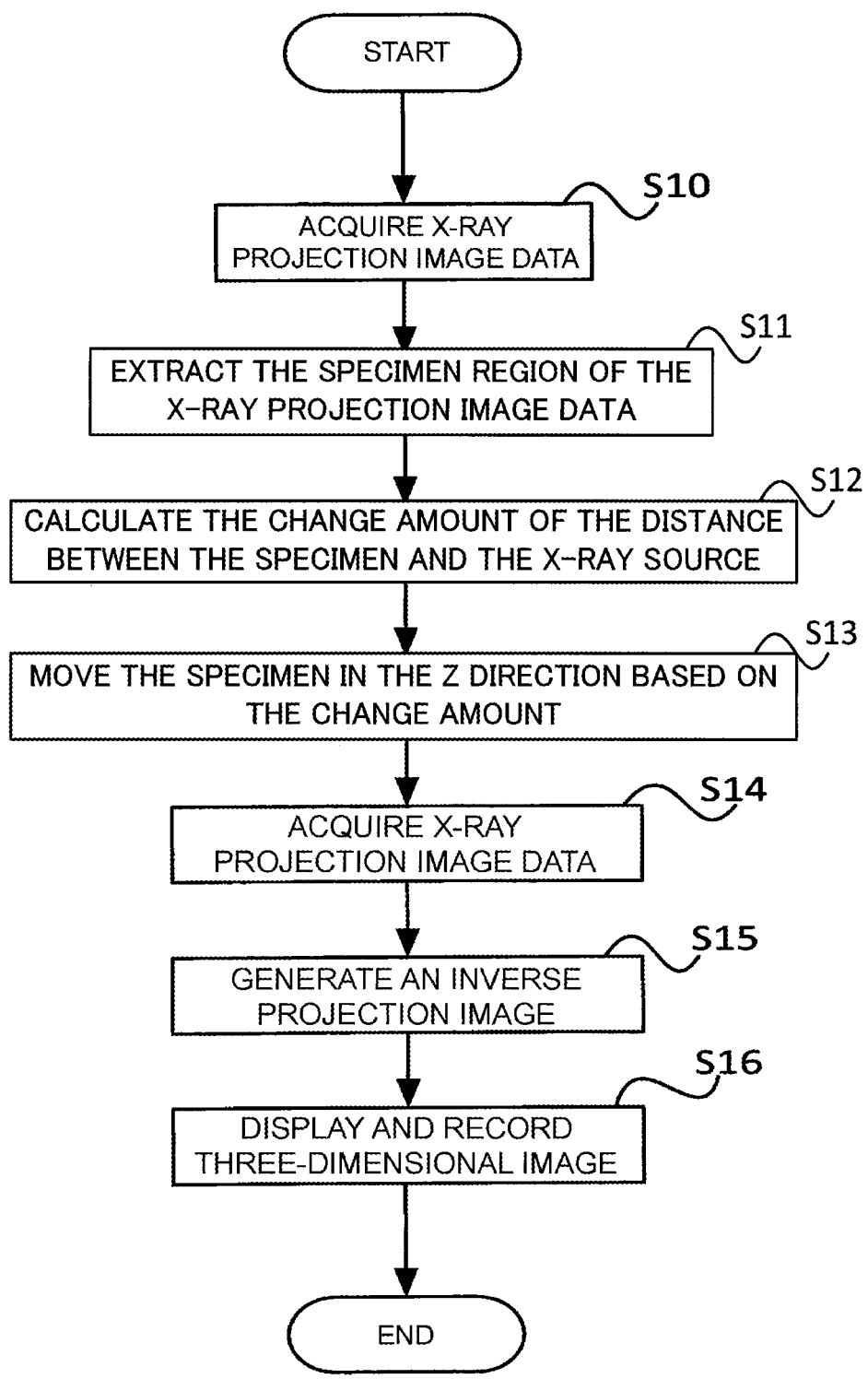
FIG. 9 is a flowchart describing the operation of the X-ray apparatus.

An operation of the X-ray device 100 according to an embodiment will be described while referring to the flowchart illustrated in FIG. 9. A process illustrated in FIG. 9 is performed by executing a program by the control device 5. The program is stored in a memory (not illustrated in the drawing) in the control device 5, and is activated and executed by the control device 5.

In the step S10, the preliminary inspection unit 54 of the control device 5 controls the X-ray control unit 51, movement control unit 52, and image generation unit 53, and acquires X-ray projection image data, and then the process proceeds to step S11. In step S11, the region extraction unit 56 extracts the specimen region R2 corresponding to a region where the inclusion region R1 included when the specimen S rotates is projected on the incident surface 41 of the detector 4 from the acquired X-ray projection image data, and then the process proceeds to step S12.

In the step S12, the calculating unit 57 calculates the change amount ΔZ of the specimen S in the Z-axis direction, based on the detection range of the detector 4 and outermost edge portion of the extracted specimen region R2, and then the process proceeds to step S13. In the step S13, the movement control unit 52 moves the placement stage 30 along the Z-axis direction, based on calculated change amount ΔZ, and then the process proceeds to step S14. Note that the process from the aforementioned steps S10 to S13 is a process during preliminary inspection.

In step S14, the X-ray control unit 51, movement control unit 52, and image generation unit 53 control the X-ray source 2, rotation of the placement stage 30, and detector 4 to acquire X-ray projection image data, and then the process proceeds to step S15. In step S15, the image generation unit 53 generates a back projection image using the acquired X-ray projection image data, and then the process proceeds to step S16. In step S16, a three-dimensional image is displayed on the display monitor 6 or stored in a storage medium, based on the generated back projection image, and thus the process ends. Note that the process from the aforementioned steps S14 to S16 is a process during the main inspection.

As described above, the specimen region R2 corresponding to a region where the specimen S is projected onto the detector 4 based on rotation of the specimen S can be extracted from a plurality of X-ray projection image data output from the detector 4.

According to aforementioned Embodiment 1, the following effects are obtained.

(1) The region extraction unit 56 can extract a specimen region from a contour of data synthesized from the plurality of extraction data output from the detector 4, and extract the inclusion region R1 which is a region through which at least a portion of the specimen S passes when the specimen S is rotated. Therefore, a step of generating a back projection image can be omitted, and thus processing load on the entire device can be reduced and the time required for processing can be reduced, as compared to extracting the specimen region R2 of the specimen S from the back projection image.

(2) The movement control unit 52 changes the distance between the specimen S and X-ray source 2 based on the specimen region R2 extracted by the region extraction unit 56. In this case, the calculating unit 57 calculates the change amount of the distance between the specimen S and X-ray source 2 based on the specimen region R2, and the movement control unit 52 changes the distance in accordance with the change amount ΔZ calculated by the calculating unit 57. Therefore, a step of generating a back projection image can be omitted, and thus reduction of the measuring time is achieved, as compared to extracting the specimen region R2 from the back projection image. Furthermore, the change amount of the distance of the specimen S is not required to be calculated using a captured image acquired using an image capturing device or the like, and therefore, the number of constituent devices configuring the X-ray device 100 is reduced, which contributes to reducing manufacturing cost.

(3) The region extraction unit 56 generates synthesized data by synthesizing a plurality of the X-ray projection image data, and then extracts an outer edge portion of the specimen S in the synthesized data as the specimen region R2. Therefore, extraction of the specimen region R2 can be performed without using a back projection image, and thus generation processing of a back projection image during preliminary inspection is not required to be performed. Therefore, processing load can be reduced.

(4) The calculating unit 57 calculates the change amount ΔZ based on the outermost edge portion with the shorter distance to the detection range of the detector 4 between an outermost edge portion in the X-axis direction where the distance from the detection range of the detector 4 is shortest in the X-axis direction orthogonal to the rotational axis Yr, and an outermost edge portion in the Y-axis direction where the distance from the detection range of the detector 4 is shortest in the Y-axis direction along the rotational axis Yr, among the outer edge portions of the specimen region R2. In other words, the calculating unit 57 calculates the change amount ΔZ based on one of the first changeable amount ΔZw calculated based on the ratio between the length of segment Fw along the X-axis direction of the specimen region R2 and length Dw×α in the X-axis direction of the detection range of the detector 4, and the second changeable amount ΔZh of a distance calculated based on the ratio between the length of segment Fh along the Y-axis direction of the specimen region R2 and length Dh×α in the Y-axis direction of the detection range of the detector 4. Therefore, the position of the specimen S where a desired effective maximum projection magnification is achieved during the main inspection can be calculated using the extracted specimen region R2.

(5) The calculating unit 57 compares the first changeable amount ΔZw and second changeable amount ΔZh and then calculates the shorter value as the distance change amount ΔZ. Therefore, even a portion of the specimen region R2 can be prevented from deviating from an outer portion of the detection range of the detector 4 during the main inspection. Furthermore, the specimen S can be moved to a position that does not impact or contact the portions of the X-ray device 100.

(6) After the relative distance between the X-ray source 2 and specimen S are changed by the movement control unit 52, the image generation unit 53 generates a back projection image of the specimen S based on the plurality of X-ray projection image data output from the detector 4 based on X-rays emitted from the X-ray source 2. In other words, the preliminary inspection unit 54 calculates the change amount ΔZ of the distance between the specimen S and X-ray source 2 using the X-ray projection image data, and changes the distance between the specimen S and X-ray source 2 based on the calculated change amount ΔZ, and then the image generation unit 53 generates a back projection image of the specimen S. Therefore, in the main inspection, a back projection image of the specimen S can be generated at a projection magnification desired by a user while performing measurements at a position where the specimen S does not impact or contact the portions of the X-ray device 100.

The following modifications are also within the scope of the present invention, and one modified example or a plurality of modified examples can be combined with the aforementioned embodiment.

(1) At the time of the preliminary inspection, the process of acquiring the X-ray projection image data, the process of extracting the specimen region R2, the process of calculating the change amount, and the process of moving the specimen S based on the change amount were described as if occurring automatically, but during the preliminary inspection, at least the process of acquiring the X-ray projection image data and the process of extracting the specimen region R2 should be performed. For example, the calculating unit 57 may calculate the change amount to achieve the rejection magnification specified by the user, without calculating the change amount for the predetermined projection magnification of the specimen S in the back projection image. In this case, in order to understand the relationship between the size of the synthesized data and the specimen region R2, an image corresponding to the synthesized data and the specimen region R2 can be displayed on a display monitor 6.

The movement control unit 52 does not necessarily automatically move the placement stage 30 in the X-axis direction based on the change amount that was calculated, and thus change the distance in the Z-axis direction between the specimen S and the X-ray source 2. For example, the control unit 5 notifies the user of the amount of movement of the placement stage 30 by displaying on a display monitor 6 for example, based on the change amount calculated by the calculating unit 57. The user can change the distance in the Z-axis direction between the specimen S and the X-ray source 2 by manually moving the placement stage 30 according to the movement amount that was notified.

Figure 10A:
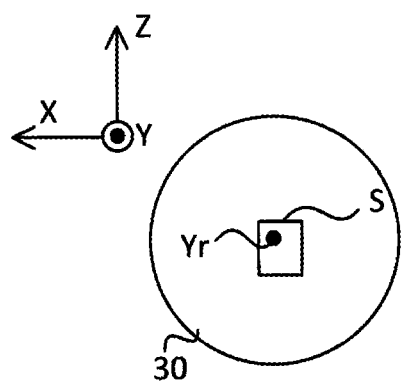
FIGS. 10A and 10B are diagrams schematically illustrating the positional relationship between the X-ray source and the specimen for an alternate example.
Figure 10B:
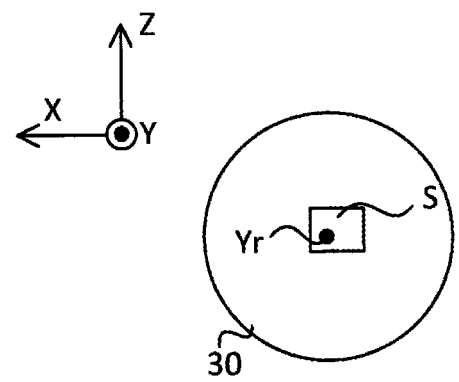

(2) An example where the X-ray projection image data was acquired at 4 points during preliminary inspection was described, but the number of data points of the X-ray projection image data is not restricted to 4. However, at least two data points of X-ray projection image data are necessary. FIGS. 10A and 10B schematically illustrate the positional relationship between the X-ray source 2 and the specimen S when acquiring two data points of X-ray projection image data. FIGS. 10A and 10B are diagrams as viewed from the Y-axis+side. In this case, the X-ray projection image data can be acquired at the position where the specimen S is closest to the X-ray source 2, as illustrated in FIG. 10A, or the position where the specimen S is expected to be at a maximum distance in the X-axis direction from the X-ray optical axis Zr, as illustrated in FIG. 10B. In other words, for the case of acquiring two data points of X-ray projection image data, the X-ray projection image data is acquired in a condition where the specimen S is rotated to the side closest to the X-ray source 2 with regard to the rotational axis Yr in accordance with the rotation of the placement stage 30. If the X-ray projection image data of the specimen S is acquired at a position away from the X-ray source 2, the size of the specimen region R2 will be smaller than the specimen region R2 for the case where the X-ray projection image data is acquired when the distance from the X-ray source 2 is close, and there is concern that the change amount calculated by the calculating unit 57 will be too large. If the change amount is too large, the entire image of the specimen S will not fit on the back projection image, and there is a possibility that the specimen S will collide with a structure such as the X source 2 or the like during the main inspection. Therefore, the aforementioned problems can be suppressed by acquiring the X-ray projection image data in a state where the specimen S is rotated to the side where the distance to the X-ray source 2 is closer.

(3) The X-ray source 2 can have a configuration that moves in the Z-axis direction instead of moving the specimen S in the Z-axis direction with regard to the X-ray source 2. In this case, the detector 4 is also moved in conjunction with the movement of the X-ray source 2.

(4) If at least a portion of the projection range of the specimen S is located further to the outside than the detection range of the detector 4 in the X-ray projection image data acquired during preliminary inspection, there is a possibility that the specimen S will be too close to the X-ray source 2 and will collide with a structure such as the X-ray source 2 or the like. In this case, the preliminary inspection can be halted at that moment. At this time, a warning can be displayed on the display monitor 6 showing that the specimen S is too close to the X-ray source 2 so that the user can change the position of the placement stage 30.

(5) With the aforementioned embodiment, the region extracting unit 56 extracts the specimen region R2 from the contour of the data synthesized from the plurality of detection data output from the detector 4, and the movement amount in the Z-axis direction and the Y-axis direction of the specimen S and the X-ray source 2 is calculated, but the direction of calculating the movement amount is not limited to this example. For example, the movement amount in the X-axis direction of the specimen S and the X-ray source 2 can be calculated. Naturally, the movement can be in the X-axis direction and/or the Y-axis direction and/or the Z-axis direction. As appropriate, the direction of calculating the movement amount can be a combination of all directions, or the movement can be only in a specific direction.

Note that with the aforementioned embodiment, the placement unit 3 was rotated between the X-ray source 2 and the detector 4, but the placements thereof are not limited to this. For example, a line that links the center of the detector 4 and a light emitting point of the X-ray source 2 intersected with the rotational axis Yr of the placement unit 3 at 90°, but this is not a limitation, and for example, the intersection can be at 10°, 20°, 30°, 40°, 50°, 60°, 70°, or 80°. Furthermore, a placement where the line that links the light emitting point of the X-ray source 2 and the center of the detector 4 can be oriented to intersect with the rotating surface of the placement unit 3, as disclosed in U.S. Ser. No. 10/689,604, may be acceptable. In this case, the inclusion region R1 for the specimen S was determined, and at least one position of the X-ray source 2, specimen S, and detector 4 can be changed so as to broaden the projection region of the specimen S at the detector 4.

Furthermore, the aforementioned embodiment can be applied to an X-ray device with a plurality of X-ray sources as disclosed in US 2005/0,254,621, U.S. Pat. No. 7,233,644, and the like for example. Furthermore, the aforementioned embodiment can also be applied to an X-ray device with a phase contrast system that evaluates slight phase shifting that occurs in X-rays during proceeding into the specimen, as disclosed in US 2010/0,220,834. Furthermore, the aforementioned embodiment can also be applied to a helical type X-ray device that successively moves the specimen along a rotational axis that rotates the specimen, as disclosed in US 2006/0262,893, WO2014/165,455, and the like for example.

Embodiment 2

A structure manufacturing system according to an embodiment of the present invention is described below while referring to the drawings. The structure manufacturing system of the present embodiment creates molded component such as, for example, a door portion, an engine portion, or a gear portion of an automobile, or an electronic component that incorporates an electrical circuit board and the like.

Figure 11:
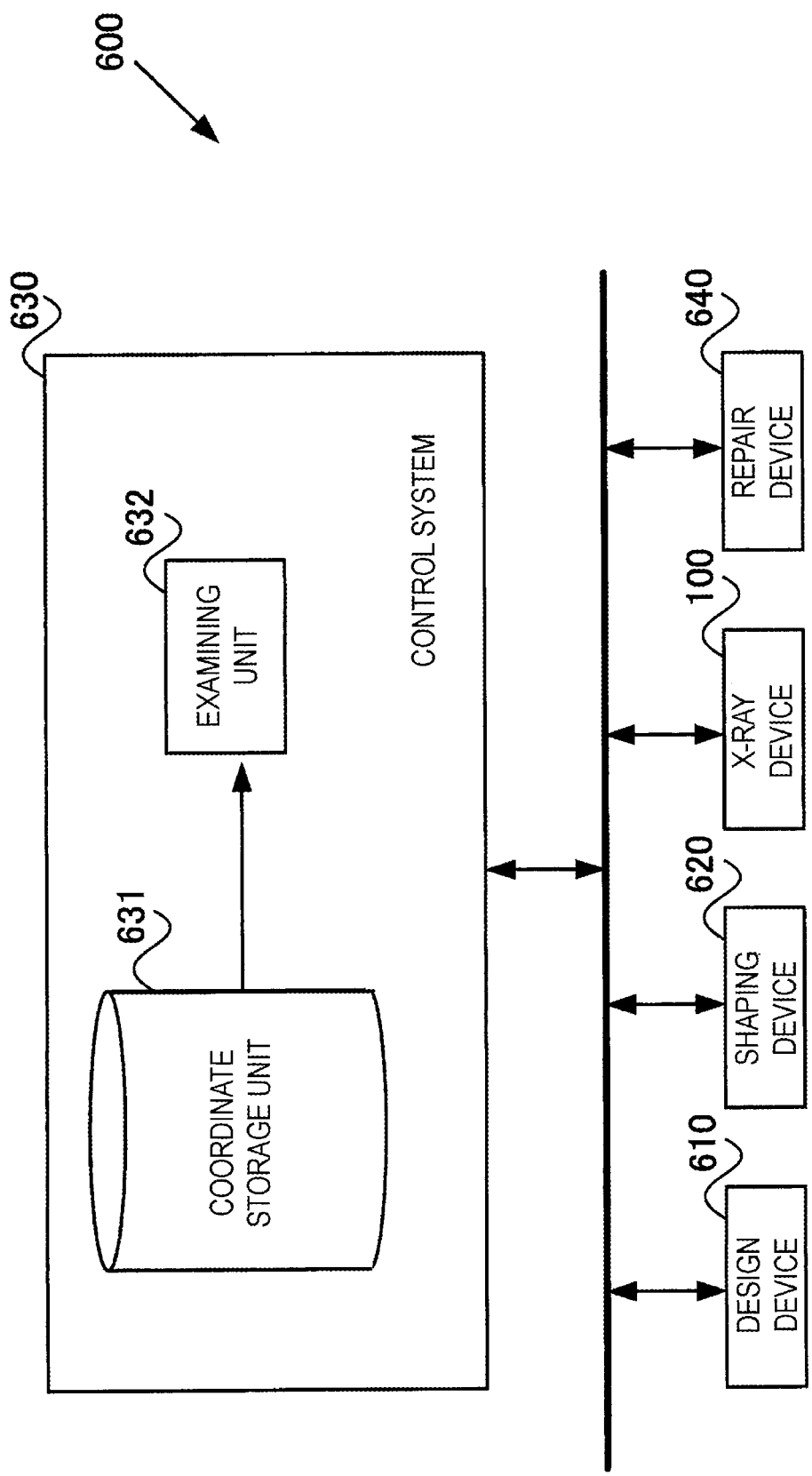
FIG. 11 is a block diagram illustrating a configuration of a structure manufacturing system according to a second embodiment.

FIG. 11 is a block diagram illustrating one example of a configuration of a structure manufacturing system 600 according to the present embodiment. The structure manufacturing system 600 is provided with the X-ray device 100 described in the first embodiment or alternate examples, a design device 610, a molding device 620, a control system 630, and a repair device 640.

The design device 610 is a device used by a user when creating design information relating to a shape of a structure and performs design processing for creating and storing the design information. The design information is information indicating coordinates of each position of the structure. The design information is output to the molding device 620 and the control system 630, which is described below. The molding device 620 performs molding processing for creating and molding the structure using the design information created by the design device 610. In this case, a molding device 620 that performs at least one of laminating which is representative in 3D-printer technology, casting, forging, and cutting is also included in one aspect of the present invention.

The X-ray device 100 performs a measuring process for measuring a shape of the structure molded by the molding device 620. The X-ray device 100 outputs to the control system 630 information indicating coordinates of the structure ("shape information" hereinbelow), which is a measurement result of measuring the structure. The control system 630 is provided with a coordinate storage unit 631 and an inspection unit 632. The coordinate storage unit 631 stores the design information created by the design device 610 described above.

The inspection unit 632 determines whether the structure molded by the molding device 620 is molded according to the design information created by the design device 610. In other words, the inspection unit 632 determines whether the molded structure is a non-defective product. In this case, the inspection unit 632 reads the design information stored in the coordinate storage unit 631 and performs inspection processing comparing the design information and the shape information input from the X-ray device 100. For the inspection processing, the inspection unit 632 compares, for example, the coordinates indicated by the design information and the corresponding coordinates indicated by the shape information and determines that the molded structure is a non-defective product molded if the result of this inspection processing shows the the coordinates of the design information and the coordinates of the shape information match. When the coordinates of the design information and the corresponding coordinates of the shape information do not match, the inspection unit 632 determines whether a difference between the coordinates is within a predetermined range and determines that the molded structure is a repairable defective product if this difference is within the predetermined range.

When it determines that the molded structure is a repairable defective product, the inspection unit 632 outputs to the repair device 640 repair information indicating a defective area and a repair amount. The defective area is the coordinates of the shape information that do not match the coordinates of the design information, and the repair amount is the difference between the coordinates of the design information and the coordinates of the shape information at the defective area. The repair device 640 performs repair processing for re-machining the defective area of the structure based on the input repair information. The repair device 640 performs again processing similar to the molding processing performed by the molding device 620.

Figure 12:
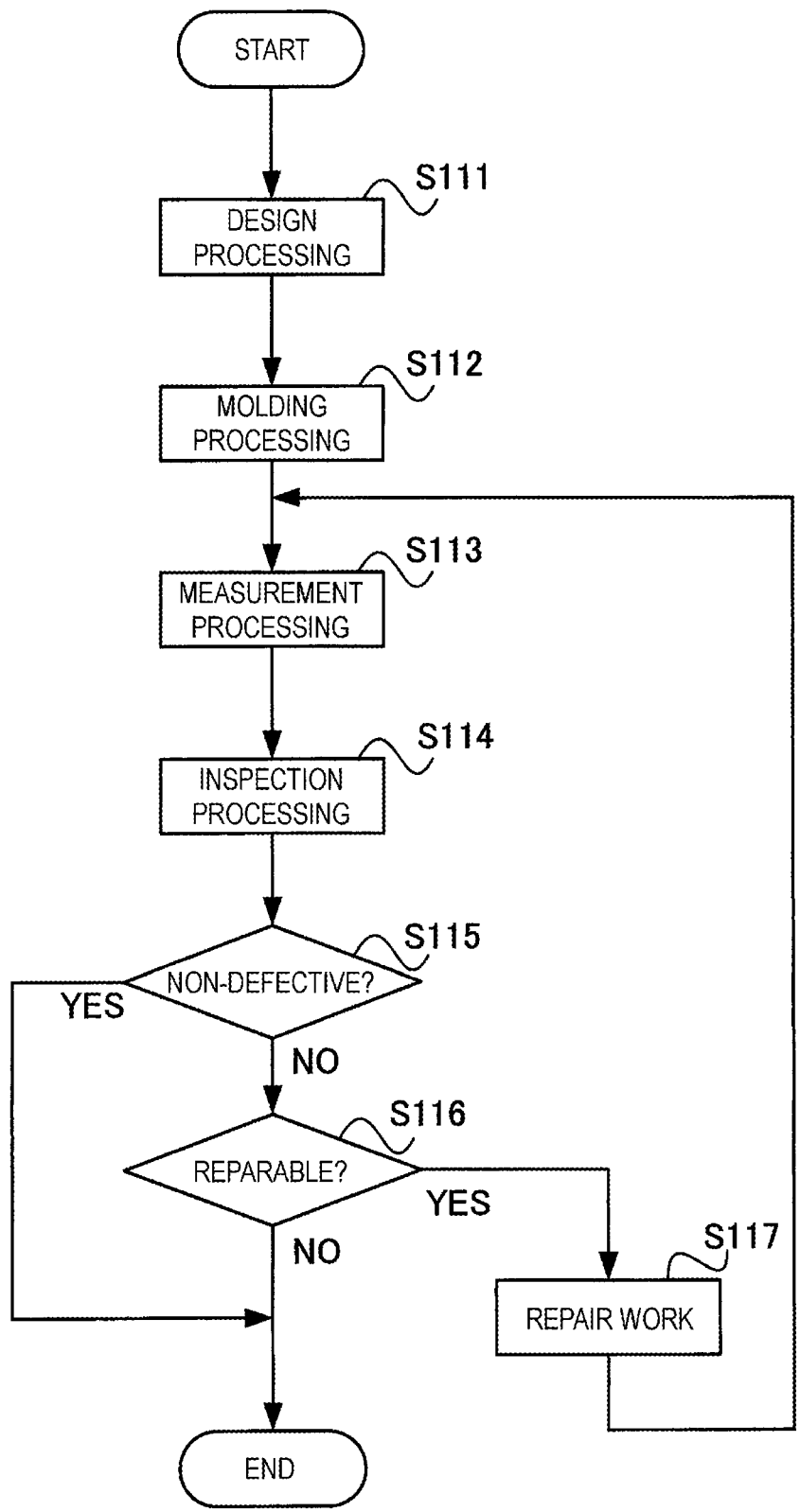
FIG. 12 is a flowchart describing the operation of a structure manufacturing system.

The processing performed by the structure manufacturing system 600 is described with reference to the flowchart illustrated in FIG. 12.

In step S111, the design device 610 is used when the user designs the structure and the design information relating to the shape of the structure is created and stored by the design processing; the flow then proceeds to step S112. Note that the present invention is not limited to only the design information created by the design device 610; when design information already exists, inputting this design information to acquire the design information is also included in one aspect of the present invention. In step S112, the molding device 620 creates and molds the structure based on the design information by the molding processing; the flow then proceeds to step S113. In step S113, the X-ray device 100 performs measurement processing to measure the shape of the structure and outputs the shape information; the flow then proceeds to step S114.

At step S114, the inspection unit 632 performs the inspection processing to compare the design information created by the design device 610 and the shape information measured and output by the X-ray device 100; the flow then proceeds to step S115. At step S115, the inspection unit 632 determines based on the result of the inspection processing whether the structure molded by the molding device 620 is a non-defective product. When the structure is a non-defective product, that is, when the coordinates of the design information and the coordinates of the shape information match, an affirmative determination is made at step S115; the processing then ends. If the structure is a defective product, that is, when the coordinates of the design information and the coordinates of the shape information do not match or when coordinates that are not present in the design information are detected, a negative determination is made in step S115; the flow then proceeds to step S116.

In step S116, the inspection unit 632 determines whether the defective area of the structure is repairable. When the defective area is unrepairable, that is, when the difference between the coordinates of the design information and the coordinates of the shape information exceeds the predetermined range, a negative determination is made in step S116; the processing then ends. When the defective area is repairable, that is, when the difference between the coordinates of the design information and the coordinates of the shape information are within the predetermined range, an affirmative determination is made in step S116; the flow then proceeds to step S117. In this case, the inspection unit 632 outputs the repair information to the repair device 640. At step S117, the repair device 640 performs the repair processing on the structure based on the input repair information; the flow then returns to step S113. Note that as described above, the repair device 640 performs again processing similar to the molding processing performed by the molding device 620 in the repair processing.

The structure manufacturing system according to the second embodiment described above provides the following functions and effects.

(1) The X-ray device 100 of the structure manufacturing system 600 performs measurement processing for acquiring the shape information of the structure created by the molding device 620 based on the design processing of the design device 610, and the inspection unit 632 of the control system 630 performs inspection processing for comparing the shape information acquired in the measurement processing and the design information created in the design processing. Therefore, inspection of a defect in the structure and information about the inside of the structure can be acquired by a nondestructive inspection to determine whether the structure is a non-defective product created according to the design information, which contributes to quality management of the structure.

(2) The repair device 640 performs the repair processing that performs again molding processing on the structure based on the comparison result of the inspection processing. Therefore, processing similar to the molding processing can be applied again to the structure when the defective portion of the structure is repairable, which contributes to manufacturing a structure of a high quality approaching the design information.

The present invention is not limited to the embodiments described above, and various modifications may be made without departing from the spirit of the present invention. Other embodiments that embody the technical concepts of the present invention are also included within the scope of the present invention.

What is claimed is:

1. An X-ray inspection device, comprising:
   a radiation source that irradiates X-rays toward a specimen;
   a detector that detects transmitted X-rays irradiated by the radiation source and passed through the specimen, and outputs detection data of X-rays that have passed from a plurality of directions related to the specimen;
   a generation unit that generates synthesized data by synthesizing a plurality of detection data;
   a region extraction unit that extracts an outermost edge of the specimen on the synthesized data; and
   a setting unit that sets a relative positional relationship between the radiation source, the specimen and the detector during an inspection, based upon one of a length of the outermost edge along a first direction and a length of the outermost edge along a second direction different from the first direction, by using the synthesized data generated by the generation unit.

2. The X-ray inspection device according to claim 1, further comprising
   a change unit that changes a relative distance between the radiation source, the specimen and the detector, respectively, based on the relative positional relationship to be set by the setting unit.

3. The X-ray inspection device according to claim 2, further comprising
   a calculating unit that calculates a change amount in the relative distance between the radiation source, the specimen and the detector, respectively; wherein
   the change unit changes the relative distance based on the change amount that was calculated by the calculating unit.

4. The X-ray inspection device according to claim 3, wherein:
   the region extracting unit extracts a region where the specimen is projected onto the detector, using the synthesizing data; and
   the calculating unit calculates the relative positional relationship based upon the region extracted by the region extracting unit.

5. The X-ray inspection device according to claim 4, wherein
   the region extracting unit extracts the outermost edge of the specimen on the synthesizing data as the region to be extracted.

6. The X-ray inspection device according to claim 5, wherein
   the region extracting unit extracts an outermost edge portion in the first direction where a distance to a detection range of the detector is shortest in the first direction that is orthogonal to an axis of rotation, and an outermost edge portion in the second direction where the distance to the detection range of the detector is shortest in the second direction along the axis of rotation, among the outer edge portions of the extracted region; and
   the calculating unit calculates the change amount in the relative distance based on an outermost edge portion where the distance to the detection range of the detector is shortest among the outermost edge portion in the first direction and the outermost edge portion in the second direction.

7. The X-ray inspection device according to claim 6, wherein
   the calculating unit calculates the change amount in the relative distance based on one of a first ratio between a first segment and the length in the first direction of the detection region of the detector, and a second ratio between a second segment and the length in the second direction of the detection range of the detector, in a rectangular region surrounded by the first segment in the first direction that contacts the outer edge portion of the extracted region in synthesized data and the second segment in the second direction that intersects with the first direction and contacts the outer edge portion of the extracted region.

8. The X-ray inspection device according to claim 7, wherein
   the calculating unit compares a first change amount of the relative distance based on the first ratio with a second change amount of the relative distance based on the second ratio, and calculates a smaller value of the first and second change amounts as the change amount of the relative distance.

9. The X-ray inspection device according to claim 7, wherein
   the change unit changes the relative distance by moving the specimen or the radiation source along a direction of an optical axis of the radiation source, based on the change amount in the relative distance calculated by the calculating unit.

10. The X-ray inspection device according to claim 9, further comprising
    a rotating placement unit that places and rotates the specimen; wherein
    the change unit changes the relative distance between the specimen and the radiation source by moving the rotating placement unit along the direction of the optical axis of the radiation source.

11. The X-ray inspection device according to claim 10, wherein
    the change unit changes the relative positional relationship between the specimen and the radiation source by moving the rotating placement unit along a direction of a rotational axis such that a center in the second direction of the region to be extracted in the synthesized data aligns with a center point of the detection range of the detector in the second direction.

12. The X-ray inspection device according to claim 4, wherein the region extracting unit extracts the region by binarizing the synthesized data.

13. The X-ray inspection device according to claim 2, further comprising
an image generating unit that generates a back projection image of the specimen based on the plurality of detection data detected and output by the detector based on an irradiation of the X-rays from the radiation source, after the relative distance between the radiation source and the specimen has been changed by the change unit.

14. A method for manufacturing structures, comprising:
creating design information regarding a shape of a structure;
creating the structure based on the design information;
acquiring shape information by measuring the shape of the created structure by using the X-ray inspection device according to claim 1; and
comparing the acquired shape information with the design information.

15. The method for manufacturing structures according to claim 14, wherein
performing refabrication of the structure by implementation based on comparison results between the shape information and the design information.

16. The method for manufacturing structures according to claim 15, wherein
the refabrication of the structure comprises performing creation of the structure again based on the design information.

17. An X-ray inspection device, comprising:
a radiation source that irradiates X-rays onto the specimen;
a detector that detects transmitted X-rays irradiated from the radiation source and passed through the specimen, and outputs detection data;
a generation unit that generates synthesized data by synthesizing a plurality of detection data;
a region extraction unit that extracts an outermost of the specimen on the synthesized data:
a setting unit that sets a relative positional relationship between the radiation source, the specimen and the radiation source during an inspection, based upon one of a length of the outermost edge along a first direction and a length of the outermost edge along a second direction different from the first direction, by using the synthesizing data generated by the generation unit; and
an image generating unit that generates a back projection image of the specimen using the detection data output from the detector that detects the transmitted X-rays from the radiation source after the relative positional relationship was set by the setting unit.

18. The X-ray inspection device according to claim 17, wherein
the radiation source irradiates X-rays onto a specimen that is rotated;
the detector outputs a plurality of detection data for each rotated angle; and
the setting unit extracts a region where the specimen is projected on the detector from the plurality of detection data, calculates the change amount in the relative distance based on the region where the specimen is projected, and changes the relative distance based on the change amount that was calculated.

19. An X-ray inspection method, comprising:
irradiating X-rays from the radiation source onto a specimen;
detecting transmitted X-rays irradiated by the radiation source and passed through the specimen on a detector;
outputting detection data of X-rays that have passed from a plurality of direction related to the specimen;
generating synthesizing data by synthesizing a plurality of detection data;
extracting an outermost edge of the specimen on the synthesized data; and
setting a relative positional relationship between the radiation source, the specimen and the detector during an inspection, based upon one of a length of the outermost edge along a first direction and a length of the outermost edge along a second direction different from the first direction, by using the synthesized data that is generated.

20. The X-ray inspection method according to claim 19, wherein
a relative distance between the radiation source, the specimen and the detector, respectively, based on the relative positional relationship that is to be set.

21. The X-ray inspection method according to claim 20, further comprising:
calculating a change amount in the relative distance between the radiation source, the specimen and the detector, respectively; and
changing the relative distance based on the calculated change amount.

22. The X-ray inspection method according to claim 21, further comprising
generating a back projection image of the specimen based on the plurality of detection data detected and output based on an irradiated of the X-rays, after changing the relative distance between the radiation source and the specimen.

* * * * *